US009282081B2

(12) United States Patent
Collins et al.

(10) Patent No.: US 9,282,081 B2
(45) Date of Patent: *Mar. 8, 2016

(54) REDUCED TRACEABILITY ELECTRONIC MESSAGE SYSTEM AND METHOD

(75) Inventors: Joseph Collins, Chicago, IL (US); Amit Jindas Shah, Chicago, IL (US)

(73) Assignee: VaporStream Incorporated, Chicago, IL (US)

( * ) Notice: Subject to any disclaimer, the term of this patent is extended or adjusted under 35 U.S.C. 154(b) by 345 days.

This patent is subject to a terminal disclaimer.

(21) Appl. No.: 13/447,932

(22) Filed: Apr. 16, 2012

(65) Prior Publication Data

US 2012/0203849 A1    Aug. 9, 2012

Related U.S. Application Data

(63) Continuation-in-part of application No. 12/605,885, filed on Oct. 26, 2009, now Pat. No. 8,291,026, which is a continuation of application No. 11/401,148, filed on Apr. 10, 2006, now Pat. No. 7,610,345.

(60) Provisional application No. 60/703,367, filed on Jul. 28, 2005.

(51) Int. Cl.
*G06F 3/00*    (2006.01)
*G06F 7/04*    (2006.01)
(Continued)

(52) U.S. Cl.
CPC ............ *H04L 63/04* (2013.01); *G06F 21/10* (2013.01); *G06Q 10/00* (2013.01); *G06Q 10/107* (2013.01); *H04L 51/02* (2013.01); *H04L 51/063* (2013.01);
(Continued)

(58) Field of Classification Search
CPC ......... H04L 63/04; H04L 51/18; H04L 51/34; H04L 51/28; H04L 51/063; H04L 51/22; H04L 63/0428; H04L 67/02; G06Q 10/107
USPC ............................. 709/206; 715/752; 726/26
See application file for complete search history.

(56) References Cited

U.S. PATENT DOCUMENTS 4,803,703 A  *  2/1989  DeLuca et al. ................ 375/368
5,255,356 A     10/1993  Michelman et al.
(Continued)

FOREIGN PATENT DOCUMENTS

DE    102004031677 A1    1/2006
EP         0899918        3/1999
(Continued)

OTHER PUBLICATIONS

Office Action dated Sep. 29, 2010 in related U.S. Appl. No. 12/031,845, filed Feb. 15, 2008.
(Continued)

*Primary Examiner* — Daniel C Murray
(74) *Attorney, Agent, or Firm* — Birch Tree IP Law & Strategy PLLC

(57) ABSTRACT

An electronic messaging system and method with reduced traceability. An electronic message is separated into a message content and container (header) information. In one aspect, the message content and header information are entered by a user separately using a single display image screen having separate portions for entry of message content and header information. The separate portions do not allow visibility of content in the portions to be displayed at the same time.

31 Claims, 15 Drawing Sheets

(51) Int. Cl.
*G06F 15/16* (2006.01)
*H04L 29/06* (2006.01)
*H04L 12/58* (2006.01)
*G06F 21/10* (2013.01)
*G06Q 10/00* (2012.01)
*G06Q 10/10* (2012.01)

(52) U.S. Cl.
CPC ............... *H04L 51/10* (2013.01); *H04L 51/18* (2013.01); *H04L 51/22* (2013.01); *H04L 51/28* (2013.01); *H04L 51/34* (2013.01); *H04L 63/0428* (2013.01); *G06F 2221/0737* (2013.01); *G06F 2221/2101* (2013.01); *G06F 2221/2119* (2013.01)

(56) References Cited

U.S. PATENT DOCUMENTS

| | | | |
|---|---|---|---|
| 5,457,454 A | 10/1995 | Sugano | |
| 5,560,033 A | 9/1996 | Doherty et al. | |
| 5,598,279 A * | 1/1997 | Ishii et al. | 358/402 |
| 5,608,786 A | 3/1997 | Gordon | |
| 5,675,507 A | 10/1997 | Bobo, II | |
| 5,680,551 A | 10/1997 | Martino, II | |
| 5,742,905 A | 4/1998 | Pepe | |
| 5,754,778 A * | 5/1998 | Shoujima | 709/206 |
| 5,768,503 A | 6/1998 | Olkin | |
| 5,781,741 A * | 7/1998 | Imamura et al. | 709/236 |
| 5,848,410 A * | 12/1998 | Walls et al. | 1/1 |
| 5,857,201 A | 1/1999 | Wright, Jr. | |
| 5,870,605 A | 2/1999 | Bracho | |
| 5,874,960 A | 2/1999 | Mairs et al. | |
| 5,889,942 A | 3/1999 | Orenshteyn | |
| 5,896,301 A * | 4/1999 | Barrientos | 716/113 |
| 5,903,472 A * | 5/1999 | Barrientos | 716/113 |
| 5,930,479 A | 7/1999 | Hall | |
| 5,949,348 A | 9/1999 | Kapp et al. | |
| 5,951,636 A * | 9/1999 | Zerber | 709/202 |
| 5,956,521 A | 9/1999 | Wang | |
| 5,958,005 A | 9/1999 | Thorne et al. | |
| 6,006,206 A | 12/1999 | Smith et al. | |
| 6,008,807 A * | 12/1999 | Bretschneider et al. | 715/732 |
| 6,018,801 A | 1/2000 | Palage et al. | |
| 6,038,601 A * | 3/2000 | Lambert et al. | 709/226 |
| 6,044,395 A * | 3/2000 | Costales et al. | 709/206 |
| 6,071,347 A * | 6/2000 | Ogawa et al. | 118/679 |
| 6,073,174 A | 6/2000 | Montgomerie | |
| 6,076,101 A | 6/2000 | Kamakura et al. | |
| 6,134,432 A * | 10/2000 | Holmes et al. | 455/412.1 |
| 6,161,129 A * | 12/2000 | Rochkind | 709/206 |
| 6,178,331 B1 | 1/2001 | Holmes et al. | 455/466 |
| 6,209,100 B1 | 3/2001 | Robertson et al. | |
| 6,233,318 B1 | 5/2001 | Picard et al. | |
| 6,268,855 B1 | 7/2001 | Mairs et al. | |
| 6,271,839 B1 | 8/2001 | Mairs et al. | |
| 6,285,363 B1 | 9/2001 | Mairs et al. | |
| 6,288,704 B1 * | 9/2001 | Flack et al. | 345/158 |
| 6,289,212 B1 * | 9/2001 | Stein et al. | 455/412.1 |
| 6,289,450 B1 | 9/2001 | Pensak et al. | |
| 6,298,446 B1 * | 10/2001 | Schreiber et al. | 726/27 |
| 6,324,569 B1 * | 11/2001 | Ogilvie et al. | 709/206 |
| 6,339,825 B2 | 1/2002 | Pensak et al. | |
| 6,353,892 B2 * | 3/2002 | Schreiber et al. | 726/26 |
| 6,357,010 B1 | 3/2002 | Viets et al. | |
| 6,370,656 B1 | 4/2002 | Olarig et al. | |
| 6,411,684 B1 | 6/2002 | Cohn | |
| 6,434,702 B1 | 8/2002 | Maddalozzo, Jr. et al. | |
| 6,438,594 B1 | 8/2002 | Bowman-Amuah | |
| 6,442,592 B1 | 8/2002 | Alumbaugh | |
| 6,449,721 B1 | 9/2002 | Pensak et al. | |
| 6,487,586 B2 * | 11/2002 | Ogilvie et al. | 709/206 |
| 6,516,416 B2 | 2/2003 | Gregg et al. | |
| 6,529,500 B1 | 3/2003 | Pandharipande | |
| 6,549,194 B1 | 4/2003 | McIntyre et al. | |
| 6,556,586 B1 | 4/2003 | Sipila | |
| 6,563,800 B1 | 5/2003 | Salo | |
| 6,591,291 B1 | 7/2003 | Gabber et al. | |
| 6,601,088 B1 * | 7/2003 | Kelley et al. | 709/206 |
| 6,606,659 B1 | 8/2003 | Hegli et al. | |
| 6,609,148 B1 | 8/2003 | Salo | |
| 6,629,138 B1 * | 9/2003 | Lambert et al. | 709/224 |
| 6,631,398 B1 | 10/2003 | Klein | |
| 6,651,185 B1 | 11/2003 | Sauvage | |
| 6,671,732 B1 * | 12/2003 | Weiner | 709/231 |
| 6,697,806 B1 | 2/2004 | Cook | |
| 6,701,346 B1 | 3/2004 | Klein | |
| 6,701,347 B1 * | 3/2004 | Ogilvie | 709/206 |
| 6,711,608 B1 * | 3/2004 | Ogilvie | 709/206 |
| 6,721,784 B1 * | 4/2004 | Leonard et al. | 709/206 |
| 6,724,370 B2 | 4/2004 | Dutta et al. | |
| 6,728,714 B1 * | 4/2004 | Doganata et al. | 1/1 |
| 6,730,863 B1 * | 5/2004 | Gerpheide et al. | 178/18.02 |
| 6,732,150 B1 | 5/2004 | Thrane | |
| 6,732,368 B1 | 5/2004 | Michael | |
| 6,741,855 B1 * | 5/2004 | Martin et al. | 455/419 |
| 6,742,032 B1 | 5/2004 | Castellani et al. | |
| 6,748,422 B2 | 6/2004 | Morin et al. | |
| 6,757,713 B1 * | 6/2004 | Ogilvie et al. | 709/206 |
| 6,779,022 B1 | 8/2004 | Horstmann | |
| 6,804,675 B1 | 10/2004 | Knight et al. | |
| 6,826,688 B1 | 11/2004 | Westerman et al. | |
| 6,829,599 B2 | 12/2004 | Chidlovskii | |
| 6,829,631 B1 | 12/2004 | Forman et al. | |
| 6,832,354 B2 | 12/2004 | Kawano et al. | |
| 6,834,372 B1 * | 12/2004 | Becker et al. | 715/234 |
| 6,851,049 B1 | 2/2005 | Price, III | |
| 6,922,693 B1 * | 7/2005 | Rubin et al. | 1/1 |
| 6,978,376 B2 | 12/2005 | Giroux et al. | |
| 6,993,662 B2 * | 1/2006 | Rubin et al. | 715/272 |
| 7,010,566 B1 * | 3/2006 | Jones et al. | 709/203 |
| 7,020,783 B2 * | 3/2006 | Vange et al. | 726/5 |
| 7,035,912 B2 | 4/2006 | Arteaga | |
| 7,043,563 B2 * | 5/2006 | Vange et al. | 709/245 |
| 7,062,454 B1 * | 6/2006 | Giannini et al. | 705/26.81 |
| 7,062,533 B2 | 6/2006 | Brown et al. | |
| 7,062,563 B1 | 6/2006 | Lewis | |
| 7,072,934 B2 | 7/2006 | Helgeson | |
| 7,076,085 B1 | 7/2006 | Sah | |
| 7,076,469 B2 * | 7/2006 | Schreiber et al. | 705/57 |
| 7,080,077 B2 | 7/2006 | Ramamurthy | |
| 7,111,006 B2 * | 9/2006 | Vange et al. | 1/1 |
| 7,120,615 B2 | 10/2006 | Sullivan et al. | |
| 7,120,662 B2 * | 10/2006 | Vange et al. | 709/203 |
| 7,123,609 B2 * | 10/2006 | Glasser et al. | 370/354 |
| 7,124,189 B2 | 10/2006 | Summers | |
| 7,127,518 B2 * | 10/2006 | Vange et al. | 709/230 |
| 7,130,831 B2 | 10/2006 | Howard et al. | |
| 7,143,195 B2 * | 11/2006 | Vange et al. | 709/249 |
| 7,155,539 B2 * | 12/2006 | Vange et al. | 709/250 |
| 7,155,743 B2 * | 12/2006 | Goodman et al. | 726/25 |
| 7,155,744 B2 * | 12/2006 | Schreiber et al. | 726/26 |
| 7,162,014 B2 | 1/2007 | Skladman | |
| 7,162,471 B1 | 1/2007 | Knight et al. | |
| 7,162,508 B2 | 1/2007 | Messina | |
| 7,162,649 B1 | 1/2007 | Ide | |
| 7,171,620 B2 | 1/2007 | Castellani et al. | |
| 7,171,693 B2 | 1/2007 | Tucker et al. | |
| 7,174,453 B2 | 2/2007 | Lu | |
| 7,185,359 B2 | 2/2007 | Schmidt et al. | |
| 7,185,364 B2 | 2/2007 | Knouse et al. | |
| 7,191,219 B2 * | 3/2007 | Udell et al. | 709/206 |
| 7,194,547 B2 | 3/2007 | Moreh | |
| 7,194,764 B2 | 3/2007 | Martherus et al. | |
| 7,200,635 B2 | 4/2007 | Yashchin et al. | |
| 7,213,249 B2 | 5/2007 | Tung Loo | |
| 7,219,148 B2 | 5/2007 | Rounthwaite et al. | |
| 7,222,157 B1 | 5/2007 | Sutton, Jr. et al. | |
| 7,266,779 B2 | 9/2007 | Baek et al. | |
| 7,281,272 B1 * | 10/2007 | Rubin et al. | 726/26 |
| 7,305,069 B1 | 12/2007 | Day | |
| 7,340,518 B1 * | 3/2008 | Jenkins | 709/225 |
| 7,356,564 B2 | 4/2008 | Hartselle et al. | 709/206 |
| 7,366,760 B2 * | 4/2008 | Warren et al. | 709/206 |
| 7,386,590 B2 * | 6/2008 | Warren et al. | 709/206 |

(56) References Cited

U.S. PATENT DOCUMENTS

| | | | |
|---|---|---|---|
| 7,433,949 B2 | 10/2008 | Xu et al. | |
| 7,451,359 B1 | 11/2008 | Coekaerts | |
| 7,496,631 B2* | 2/2009 | Austin-Lane et al. | 709/206 |
| 7,532,913 B2* | 5/2009 | Doulton | 455/566 |
| 7,539,755 B2 | 5/2009 | Li et al. | |
| 7,562,118 B2* | 7/2009 | Fellenstein et al. | 709/206 |
| 7,590,693 B1 | 9/2009 | Chan et al. | |
| 7,610,345 B2 | 10/2009 | Collins et al. | |
| 7,620,688 B2* | 11/2009 | Warren et al. | 709/206 |
| 7,657,759 B2* | 2/2010 | Rubin et al. | 713/193 |
| 7,664,956 B2* | 2/2010 | Goodman | 713/176 |
| 7,676,767 B2 | 3/2010 | Hofmeister et al. | |
| 7,730,150 B2* | 6/2010 | Warren et al. | 709/206 |
| 7,760,662 B2* | 7/2010 | Maeda | 370/252 |
| 7,765,285 B2 | 7/2010 | Yoshida et al. | |
| 7,765,483 B2 | 7/2010 | Schmieder et al. | |
| 7,774,414 B2* | 8/2010 | Shah | 709/206 |
| 7,783,715 B2* | 8/2010 | Muller | 709/206 |
| 7,814,158 B2* | 10/2010 | Malik | 709/206 |
| 7,836,301 B2* | 11/2010 | Harris | 713/165 |
| 7,860,932 B2* | 12/2010 | Fried | 709/206 |
| 7,899,872 B2* | 3/2011 | Warren et al. | 709/206 |
| 7,962,654 B2* | 6/2011 | Vange et al. | 709/247 |
| 7,966,376 B2* | 6/2011 | Kelso et al. | 709/206 |
| 7,975,066 B2* | 7/2011 | Vange et al. | 709/233 |
| 8,103,724 B2* | 1/2012 | Dawson et al. | 709/206 |
| 8,171,286 B2* | 5/2012 | Harris | 713/165 |
| 8,200,971 B2 | 6/2012 | Edwards | |
| 8,255,465 B2 | 8/2012 | Edwards | |
| 8,291,026 B2 | 10/2012 | Collins et al. | |
| 8,364,764 B2* | 1/2013 | Hartselle et al. | 709/206 |
| 8,386,641 B2* | 2/2013 | Vange et al. | 709/240 |
| 8,417,770 B2* | 4/2013 | Vange et al. | 709/203 |
| 8,463,935 B2* | 6/2013 | Vange et al. | 709/232 |
| 8,650,256 B2* | 2/2014 | Chakra et al. | 709/206 |
| 8,725,809 B2* | 5/2014 | Hartselle et al. | 709/204 |
| 8,886,739 B2 | 11/2014 | Collins et al. | |
| 8,935,351 B2 | 1/2015 | Collins et al. | |
| 9,147,050 B2 | 9/2015 | Park et al. | |
| 9,154,926 B1 | 10/2015 | Steele et al. | |
| 2001/0000265 A1* | 4/2001 | Schreiber et al. | 713/201 |
| 2001/0000359 A1* | 4/2001 | Schreiber et al. | 713/201 |
| 2001/0000541 A1* | 4/2001 | Schreiber et al. | 713/100 |
| 2001/0006551 A1 | 7/2001 | Masaki | |
| 2001/0034791 A1 | 10/2001 | Clubb et al. | |
| 2001/0037316 A1 | 11/2001 | Shiloh | |
| 2001/0044831 A1 | 11/2001 | Yamazaki | |
| 2002/0002602 A1* | 1/2002 | Vange et al. | 709/219 |
| 2002/0002603 A1* | 1/2002 | Vange | 709/219 |
| 2002/0002611 A1* | 1/2002 | Vange | 709/223 |
| 2002/0002618 A1* | 1/2002 | Vange | 709/228 |
| 2002/0002622 A1* | 1/2002 | Vange et al. | 709/245 |
| 2002/0002625 A1* | 1/2002 | Vange et al. | 709/246 |
| 2002/0002636 A1* | 1/2002 | Vange et al. | 709/328 |
| 2002/0002686 A1* | 1/2002 | Vange et al. | 713/201 |
| 2002/0002688 A1 | 1/2002 | Gregg et al. | |
| 2002/0004796 A1* | 1/2002 | Vange et al. | 707/10 |
| 2002/0004816 A1* | 1/2002 | Vange et al. | 709/202 |
| 2002/0016918 A1 | 2/2002 | Tucker et al. | |
| 2002/0019853 A1* | 2/2002 | Vange et al. | 709/207 |
| 2002/0023159 A1* | 2/2002 | Vange et al. | 709/228 |
| 2002/0024506 A1* | 2/2002 | Flack et al. | 345/169 |
| 2002/0026487 A1* | 2/2002 | Ogilvie et al. | 709/206 |
| 2002/0026495 A1 | 2/2002 | Arteaga | |
| 2002/0029248 A1 | 3/2002 | Cook et al. | |
| 2002/0029249 A1 | 3/2002 | Campbell et al. | |
| 2002/0032742 A1* | 3/2002 | Anderson | 709/206 |
| 2002/0049749 A1 | 4/2002 | Helgeson et al. | |
| 2002/0054120 A1 | 5/2002 | Kawano et al. | |
| 2002/0056006 A1* | 5/2002 | Vange et al. | 709/235 |
| 2002/0059170 A1* | 5/2002 | Vange | 707/1 |
| 2002/0059381 A1 | 5/2002 | Cook et al. | |
| 2002/0065892 A1 | 5/2002 | Malik | |
| 2002/0069365 A1 | 6/2002 | Howard et al. | |
| 2002/0078343 A1* | 6/2002 | Rubin et al. | 713/153 |
| 2002/0078361 A1 | 6/2002 | Giroux et al. | |
| 2002/0083016 A1 | 6/2002 | Dittrich et al. | |
| 2002/0087720 A1* | 7/2002 | Davis et al. | 709/238 |
| 2002/0091745 A1 | 7/2002 | Ramamurthy | |
| 2002/0091775 A1* | 7/2002 | Morehead et al. | 709/206 |
| 2002/0095399 A1 | 7/2002 | Devine | |
| 2002/0098831 A1 | 7/2002 | Castell et al. | |
| 2002/0099826 A1 | 7/2002 | Summers | |
| 2002/0107950 A1 | 8/2002 | Lu | |
| 2002/0112155 A1 | 8/2002 | Martherus et al. | |
| 2002/0120646 A1* | 8/2002 | Dutta et al. | 707/501.1 |
| 2002/0129140 A1 | 9/2002 | Peled et al. | |
| 2002/0143865 A1 | 10/2002 | Tung Loo | |
| 2002/0149569 A1 | 10/2002 | Dutta et al. | |
| 2002/0194470 A1 | 12/2002 | Grupe | |
| 2003/0009672 A1* | 1/2003 | Goodman | 713/176 |
| 2003/0023580 A1 | 1/2003 | Braud et al. | |
| 2003/0028809 A1* | 2/2003 | Goodman et al. | 713/201 |
| 2003/0050046 A1 | 3/2003 | Conneely et al. | |
| 2003/0054810 A1 | 3/2003 | Chen et al. | |
| 2003/0055897 A1 | 3/2003 | Brown et al. | |
| 2003/0061215 A1 | 3/2003 | Messina | |
| 2003/0074248 A1 | 4/2003 | Braud | |
| 2003/0074397 A1 | 4/2003 | Morin et al. | |
| 2003/0074552 A1 | 4/2003 | Olkin et al. | |
| 2003/0074580 A1 | 4/2003 | Knouse et al. | |
| 2003/0078890 A1* | 4/2003 | Schmidt et al. | 705/51 |
| 2003/0100292 A1 | 5/2003 | Kynast et al. | |
| 2003/0120948 A1 | 6/2003 | Schmidt et al. | |
| 2003/0126215 A1* | 7/2003 | Udell et al. | 709/206 |
| 2003/0126259 A1 | 7/2003 | Yoshida et al. | |
| 2003/0131055 A1 | 7/2003 | Yashchin et al. | |
| 2003/0131060 A1* | 7/2003 | Hartselle et al. | 709/206 |
| 2003/0147378 A1* | 8/2003 | Glasser et al. | 370/352 |
| 2003/0149737 A1* | 8/2003 | Lambert et al. | 709/214 |
| 2003/0154249 A1 | 8/2003 | Crockett et al. | |
| 2003/0154292 A1 | 8/2003 | Spriestersbach et al. | |
| 2003/0163538 A1* | 8/2003 | Yeh et al. | 709/206 |
| 2003/0167350 A1* | 9/2003 | Davis et al. | 709/316 |
| 2003/0224810 A1 | 12/2003 | Enzmann et al. | |
| 2004/0002903 A1 | 1/2004 | Stolfo et al. | |
| 2004/0015729 A1 | 1/2004 | Elms et al. | |
| 2004/0019846 A1 | 1/2004 | Castellani et al. | |
| 2004/0024788 A1* | 2/2004 | Hill et al. | 707/200 |
| 2004/0030918 A1 | 2/2004 | Karamchedu et al. | |
| 2004/0049436 A1* | 3/2004 | Brand et al. | 705/30 |
| 2004/0051736 A1* | 3/2004 | Daniell | 345/752 |
| 2004/0051897 A1 | 3/2004 | Kakiuchi et al. | |
| 2004/0059790 A1 | 3/2004 | Austin-Lane et al. | |
| 2004/0068486 A1 | 4/2004 | Chidlovskii | |
| 2004/0121762 A1 | 6/2004 | Chou et al. | |
| 2004/0133599 A1* | 7/2004 | Warren et al. | 707/104.1 |
| 2004/0133643 A1* | 7/2004 | Warren et al. | 709/206 |
| 2004/0133644 A1* | 7/2004 | Warren et al. | 709/206 |
| 2004/0177110 A1 | 9/2004 | Rounthwaite et al. | |
| 2004/0188151 A1* | 9/2004 | Gerpheide et al. | 178/18.01 |
| 2004/0189616 A1* | 9/2004 | Gerpheide et al. | 345/174 |
| 2004/0189617 A1* | 9/2004 | Gerpheide et al. | 345/174 |
| 2004/0193591 A1* | 9/2004 | Winter | 707/3 |
| 2004/0193695 A1 | 9/2004 | Salo et al. | |
| 2004/0210632 A1 | 10/2004 | Carlson et al. | |
| 2004/0210796 A1* | 10/2004 | Largman et al. | 714/20 |
| 2004/0234046 A1 | 11/2004 | Skladman | |
| 2004/0243679 A1 | 12/2004 | Tyler | |
| 2005/0010643 A1 | 1/2005 | Fellenstein et al. | |
| 2005/0027846 A1 | 2/2005 | Wolfe et al. | |
| 2005/0064883 A1 | 3/2005 | Heck | |
| 2005/0071178 A1 | 3/2005 | Beckstrom et al. | |
| 2005/0071282 A1* | 3/2005 | Lu et al. | 705/64 |
| 2005/0086186 A1 | 4/2005 | Sullivan et al. | |
| 2005/0091501 A1* | 4/2005 | Osthoff et al. | 713/181 |
| 2005/0120230 A1* | 6/2005 | Waterson | 713/188 |
| 2005/0130631 A1 | 6/2005 | Maguire et al. | |
| 2005/0132010 A1 | 6/2005 | Muller | |
| 2005/0132013 A1* | 6/2005 | Karstens | 709/206 |
| 2005/0132372 A1 | 6/2005 | Vargas et al. | |
| 2005/0144246 A1 | 6/2005 | Malik | |
| 2005/0193068 A1 | 9/2005 | Brown et al. | |
| 2005/0198365 A1 | 9/2005 | Wei | |

(56) References Cited

U.S. PATENT DOCUMENTS

| | | | |
|---|---|---|---|
| 2005/0204005 A1 | 9/2005 | Purcell et al. | |
| 2005/0204008 A1* | 9/2005 | Shinbrood | 709/206 |
| 2005/0204130 A1* | 9/2005 | Harris | 713/165 |
| 2005/0209903 A1* | 9/2005 | Hunter et al. | 705/9 |
| 2005/0229258 A1 | 10/2005 | Pigin | |
| 2005/0240666 A1 | 10/2005 | Xu et al. | |
| 2005/0240759 A1* | 10/2005 | Rubin et al. | 713/153 |
| 2005/0251399 A1 | 11/2005 | Agarwal et al. | |
| 2005/0256929 A1 | 11/2005 | Bartol et al. | |
| 2005/0266836 A1 | 12/2005 | Shan | |
| 2005/0277431 A1 | 12/2005 | White | |
| 2005/0283621 A1* | 12/2005 | Sato et al. | 713/189 |
| 2005/0289601 A1* | 12/2005 | Park et al. | 725/54 |
| 2006/0010215 A1 | 1/2006 | Clegg et al. | |
| 2006/0020714 A1 | 1/2006 | Girouard et al. | |
| 2006/0031483 A1 | 2/2006 | Lund et al. | |
| 2006/0041751 A1 | 2/2006 | Rogers et al. | |
| 2006/0046758 A1 | 3/2006 | Emami-Nouri | |
| 2006/0047748 A1* | 3/2006 | Kelso et al. | 709/204 |
| 2006/0075473 A1 | 4/2006 | Moreh | |
| 2006/0095502 A1 | 5/2006 | Lewis et al. | |
| 2006/0129697 A1* | 6/2006 | Vange et al. | 709/245 |
| 2006/0129823 A1 | 6/2006 | McCarthy et al. | |
| 2006/0140347 A1 | 6/2006 | Kaji | |
| 2006/0168058 A1 | 7/2006 | Midgley | |
| 2006/0177007 A1 | 8/2006 | Vaghar et al. | |
| 2006/0208871 A1 | 9/2006 | Hansen | |
| 2006/0212561 A1* | 9/2006 | Feng | 709/223 |
| 2006/0217126 A1 | 9/2006 | Sohm et al. | |
| 2006/0223554 A1* | 10/2006 | Fried | 455/466 |
| 2006/0229899 A1 | 10/2006 | Hyder et al. | |
| 2006/0234680 A1 | 10/2006 | Doulton | |
| 2006/0235824 A1 | 10/2006 | Cheung et al. | |
| 2006/0236095 A1 | 10/2006 | Smith | |
| 2006/0248599 A1 | 11/2006 | Sack | |
| 2006/0259492 A1 | 11/2006 | Jun et al. | |
| 2006/0265453 A1 | 11/2006 | Kaminsky et al. | |
| 2006/0282426 A1 | 12/2006 | Spears | |
| 2007/0013662 A1 | 1/2007 | Fauth | |
| 2007/0038715 A1 | 2/2007 | Collins et al. | |
| 2007/0063999 A1 | 3/2007 | Park | |
| 2007/0071222 A1 | 3/2007 | Flockhart et al. | |
| 2007/0074018 A1 | 3/2007 | Edwards | |
| 2007/0077921 A1 | 4/2007 | Hayashi | |
| 2007/0078675 A1 | 4/2007 | Kaplan | |
| 2007/0083675 A1 | 4/2007 | Vemulapelli et al. | |
| 2007/0083929 A1 | 4/2007 | Sprosts et al. | |
| 2007/0101415 A1 | 5/2007 | Masui | |
| 2007/0113287 A1 | 5/2007 | Blumenau | |
| 2007/0113288 A1 | 5/2007 | Blumenau | |
| 2007/0113289 A1 | 5/2007 | Blumenau | |
| 2007/0113293 A1 | 5/2007 | Blumenau | |
| 2007/0116001 A1* | 5/2007 | Kobayashi et al. | 370/392 |
| 2007/0130329 A1 | 6/2007 | Shah | |
| 2007/0133034 A1 | 6/2007 | Jindal et al. | |
| 2007/0136428 A1 | 6/2007 | Boutboul et al. | |
| 2007/0143423 A1* | 6/2007 | Kieselbach et al. | 709/206 |
| 2007/0177568 A1* | 8/2007 | Clontz et al. | 370/349 |
| 2007/0217393 A1* | 9/2007 | Lee et al. | 370/352 |
| 2007/0233790 A1 | 10/2007 | Agarwal et al. | |
| 2007/0250619 A1 | 10/2007 | Li et al. | |
| 2008/0010348 A1* | 1/2008 | Dawson et al. | 709/206 |
| 2008/0077704 A1 | 3/2008 | Shah et al. | |
| 2008/0126496 A1* | 5/2008 | Warren et al. | 709/206 |
| 2008/0172468 A1* | 7/2008 | Almeida | 709/206 |
| 2008/0201440 A1 | 8/2008 | Shah et al. | |
| 2008/0208998 A1* | 8/2008 | Warren et al. | 709/206 |
| 2008/0281930 A1* | 11/2008 | Hartselle et al. | 709/206 |
| 2008/0313296 A1* | 12/2008 | Muller | 709/206 |
| 2008/0320092 A1 | 12/2008 | Campbell et al. | |
| 2009/0116492 A1 | 5/2009 | Maeda | |
| 2009/0150758 A1* | 6/2009 | Gejdos et al. | 715/200 |
| 2009/0150771 A1* | 6/2009 | Buck et al. | 715/273 |
| 2009/0228557 A1 | 9/2009 | Ganz et al. | |
| 2009/0254994 A1* | 10/2009 | Waterson | 726/26 |
| 2009/0311996 A1* | 12/2009 | Furuta | 455/414.2 |
| 2010/0058118 A1 | 3/2010 | Yamaoka | |
| 2010/0064016 A1 | 3/2010 | Collins et al. | |
| 2010/0077360 A1 | 3/2010 | Nason et al. | |
| 2010/0082979 A1 | 4/2010 | Edwards | |
| 2010/0131868 A1 | 5/2010 | Chawla et al. | |
| 2010/0157998 A1* | 6/2010 | Vange et al. | 370/389 |
| 2010/0161743 A1 | 6/2010 | Krishnamurthi et al. | |
| 2010/0161747 A1 | 6/2010 | Rayan et al. | |
| 2010/0223338 A1* | 9/2010 | Hodes | 709/206 |
| 2011/0030052 A1* | 2/2011 | Harris | 726/19 |
| 2011/0055334 A1 | 3/2011 | Tivyan | |
| 2011/0061099 A1* | 3/2011 | Jiang et al. | 726/12 |
| 2011/0081923 A1* | 4/2011 | Forutanpour et al. | 455/457 |
| 2011/0083111 A1* | 4/2011 | Forutanpour et al. | 715/863 |
| 2011/0161448 A1* | 6/2011 | Warren et al. | 709/206 |
| 2011/0238860 A1* | 9/2011 | Vange et al. | 709/233 |
| 2011/0246665 A1* | 10/2011 | Vange et al. | 709/233 |
| 2011/0252161 A1* | 10/2011 | Ranney | 709/248 |
| 2011/0302321 A1* | 12/2011 | Vange et al. | 709/241 |
| 2012/0036147 A1 | 2/2012 | Borst et al. | |
| 2012/0036452 A1 | 2/2012 | Coleman et al. | |
| 2012/0054308 A1* | 3/2012 | Vange et al. | 709/217 |
| 2012/0059907 A1* | 3/2012 | Vange et al. | 709/217 |
| 2012/0114108 A1* | 5/2012 | Katis et al. | 379/88.13 |
| 2012/0203849 A1 | 8/2012 | Collins et al. | |
| 2012/0226913 A1 | 9/2012 | Park et al. | |
| 2012/0271619 A1 | 10/2012 | Abdel-Kader | |
| 2013/0097248 A1* | 4/2013 | Chakra et al. | 709/206 |
| 2013/0159436 A1* | 6/2013 | Hartselle et al. | 709/206 |
| 2013/0290443 A1 | 10/2013 | Collins et al. | |
| 2014/0074981 A1* | 3/2014 | Vange et al. | 709/217 |
| 2014/0201527 A1* | 7/2014 | Krivorot | 713/168 |
| 2014/0207887 A1* | 7/2014 | Hartselle et al. | 709/206 |
| 2015/0100657 A1 | 4/2015 | Collins et al. | |
| 2015/0106459 A1 | 4/2015 | Collins et al. | |
| 2015/0106460 A1 | 4/2015 | Collins et al. | |
| 2015/0106461 A1 | 4/2015 | Collins et al. | |
| 2015/0106743 A1 | 4/2015 | Collins et al. | |
| 2015/0106744 A1 | 4/2015 | Collins et al. | |
| 2015/0237021 A1 | 8/2015 | Sovio et al. | |
| 2015/0248557 A1 | 9/2015 | Sallam | |

FOREIGN PATENT DOCUMENTS

| | | | |
|---|---|---|---|
| EP | 0918420 | 5/1999 | |
| EP | 918420 A2 * | 5/1999 | H04L 12/58 |
| EP | 994608 A2 | 4/2000 | |
| EP | 1113631 A2 | 4/2001 | |
| EP | 1388986 | 2/2004 | |
| GB | 2430591 A * | 3/2007 | H04L 29/06 |
| GB | 2430591 B | 9/2010 | |
| JP | H11-163923 | 6/1999 | |
| JP | 2000-10879 | 1/2000 | |
| JP | 2000/10879 | 1/2000 | |
| JP | 2000-10879 | 1/2001 | |
| JP | 2003-114852 | 4/2003 | |
| JP | 2003/114852 | 4/2003 | |
| JP | 2004/038407 | 2/2004 | |
| JP | 2004-38407 | 2/2004 | |
| JP | 2004/126973 | 4/2004 | |
| JP | 2004/341813 A | 12/2004 | |
| WO | 98/59456 A2 | 12/1998 | |
| WO | 2004/095814 | 11/2004 | |
| WO | 2006/088915 A1 | 8/2006 | |
| WO | 2006088915 | 8/2006 | |
| WO | 2007/018636 | 2/2007 | |
| WO | 2008/036971 | 3/2008 | |
| WO | 2008/101165 | 8/2008 | |
| WO | 2010/151873 A1 | 12/2010 | |
| WO | 2013/158603 A1 | 10/2013 | |
| WO | 2013/158764 A1 | 10/2013 | |
| WO | 2014/047489 A2 | 3/2014 | |

OTHER PUBLICATIONS

Office Action dated Apr. 27, 2011, in related JP Application No. 2008-523868, as reported in letter dated May 11, 2011 from Yuasa and Nara.

(56) References Cited

OTHER PUBLICATIONS

Examination Report dated Dec. 22, 2011 in related European Patent Application No. 06750321.9 in the name of VaporStream Incorporated, Inc.
First Office Action dated Jan. 22, 2010 in related Chinese Patent Application No. 200680035550.0, filed Apr. 13, 2006.
Supplementary Search Report dated Mar. 30, 2010 in related European Patent Application No. 06750321.9, filed Apr. 13, 2006.
"Mixing E-mail with Babel," by Ceki Gulcu and Gene Tsudik. Proceedings of the Symposium on Network and Distributed System Security, XP-002086536, Jan. 1, 1996, pp. 2-16.
"The Mutt E-mail Client," by Michael Elkins. ftp://ftp.nluug.nl/pub/mail/mutt/historic/mutt-1.Opre2.tar.gz, XP-002245042, Sep. 1, 1999.
Office Action dated Jan. 25, 2011 in related U.S. Appl. No. 12/605,885 to Joseph Collins et al.
Response to Office Action dated May 25, 2011 in related U.S. Appl. No. 12/605,885 to Joseph Collins et al.
Examiner Interview Summary dated Jun. 14, 2011 in related U.S. Appl. No. 12/605,885 to Joseph Collins et al.
Final Office Action dated Aug. 4, 2011 in related U.S. Appl. No. 12/605,885 to Joseph Collins et al.
Examiner Interview Summary dated Nov. 23, 2011 in related U.S. Appl. No. 12/605,885 to Joseph Collins et al.
Request for Continued Examination dated Jan. 4, 2012 in related U.S. Appl. No. 12/605,885 to Joseph Collins et al.
Response to Office Action dated Jan. 4, 2012 in related U.S. Appl. No. 12/605,885 to Joseph Collins et al.
Notice of Allowance dated Jun. 11, 2012 in related U.S. Appl. No. 12/605,885 to Joseph Collins et al.
Office Action dated Mar. 13, 2009 in related U.S. Appl. No. 11/401,148 to Joseph Collins et al.
Examiner Interview Summary dated Jun. 10, 2009 in related U.S. Appl. No. 11/401,148 to Joseph Collins et al.
Response to Office Action dated Jun. 15, 2009 in related U.S. Appl. No. 11/401,148 to Joseph Collins et al.
Examiner Interview Summary dated Aug. 13, 2009 in related U.S. Appl. No. 11/401,148 to Joseph Collins et al.
Notice of Allowance dated Aug. 25, 2009 in related U.S. Appl. No. 11/401,148 to Joseph Collins et al.
312 Amendment dated Aug. 25, 2009 in related U.S. Appl. No. 11/401,148 to Joseph Collins et al.
Second Office Action dated Dec. 21, 2011 in related Chinese Patent Application No. 200680035550.0, filed Apr. 13, 2006.
Third Office Action dated Jul. 13, 2012 in related Chinese Patent Application No. 200680035550.0, filed Apr. 13, 2006.
Translation of Examination Report dated Oct. 18, 2012, in related TW Patent Application No. 095119990.
Letter Reporting Notice of Preliminary Rejection dated Nov. 2, 2012, in related KR Patent Application No. 7004841/2008.
Office Action dated Feb. 25, 2013 in related CA Application No. 2,616,911.
"Off the record Email System" (document and presentation), Paul Henry and Hui Luo, Presentation at IEEE Conference on Computer Communications (Infocom) Apr. 2001, Anchorage, Alaska, USA; last found at http://www.research.att.com:9000/~macsbug/Other_Cool_Stuff/OTREM/otrem.html on Apr. 7, 2006.
Bass, Steve. 50 fixes for the biggest PC annoyances: Windows gone wacky? Hardware gone haywire? Software gone screwy? Take a deep breath-help is here. [online] Oct. 1, 2003. [retrieved on Mar. 8, 2009] PC-World. [Retrieved from http://www.accessmylibrary.com/coms2/summary_0286-24479177_ITM] p. 3 Paragraph 5-7.
First Office Action dated Mar. 13, 2009, in related U.S. Appl. No. 11/401,148.
Interview Summary dated Jun. 10, 2009, in related U.S. Appl. No. 11/401,148.
Response to Office Action dated, Jun. 15, 2009, in related U.S. Appl. No. 11/401,148.
International Search Report and Written Opinion dated Oct. 19, 2007, for PCT International Application No. PCT/US2006/14254.
Office Action dated Aug. 19, 2009 in related U.S. Appl. No. 11/859,777.
Notice of Allowance dated Aug. 25, 2009 in related U.S. Appl. No. 11/401,148.
Rule 312 Amendment dated Aug. 25, 2009 in related U.S. Appl. No. 11/401,148.
Related pending U.S. Appl. No. 11/401,148, filed Apr. 10, 2006.
Related pending U.S. Appl. No. 11/859,777, filed Sep. 23, 2007.
Related pending U.S. Appl. No. 12/031,845, filed Feb. 15, 2008.
Related pending International Application No. PCT/US08/54093, filed Feb. 15, 2008.
U.S. Appl. No. 11/401,148, Oct. 7, 2009, Issue Notification, U.S. Pat. No. 7,610,345.
U.S. Appl. No. 14/133,875, May 21, 2014, Office Action, U.S. Pat. No. 8,935,351.
U.S. Appl. No. 14/133,875, May 28, 2014, Supplemental Office Action, U.S. Pat. No. 8,935,351.
U.S. Appl. No. 14/133,875, Jun. 9, 2014, Examiner Interview Summary, U.S. Pat. No. 8,935,351.
U.S. Appl. No. 14/133,875, Jun. 23, 2014, Examiner Interview Summary, U.S. Pat. No. 8,935,351.
U.S. Appl. No. 14/133,875, Jul. 14, 2014, Response to Office Action, U.S. Pat. No. 8,935,351.
U.S. Appl. No. 14/133,875, Jul. 23, 2014, Resubmission of Terminal Disclaimers, U.S. Pat. No. 8,935,351.
U.S. Appl. No. 14/133,875, Aug. 15, 2014, Notice of Allowance, U.S. Pat. No. 8,935,351.
U.S. Appl. No. 14/133,875, Dec. 23, 2014, Issue Notification, U.S. Pat. No. 8,935,351.
U.S. Appl. No. 14/133,897, May 28, 2014, Office Action, U.S. Pat. No. 8,886,739.
U.S. Appl. No. 14/133,897, Jun. 9, 2014, Examiner Interview Summary, U.S. Pat. No. 8,886,739.
U.S. Appl. No. 14/133,897, Jun. 23, 2014, Examiner Interview Summary, U.S. Pat. No. 8,886,739.
U.S. Appl. No. 14/133,897, Jul. 14, 2014, Response to Office Action, U.S. Pat. No. 8,886,739.
U.S. Appl. No. 14/133,897, Jul. 23, 2014, Resubmission of Terminal Disclaimers, U.S. Pat. No. 8,886,739.
U.S. Appl. No. 14/133,897, Aug. 5, 2014, Notice of Allowance, U.S. Pat. No. 8,886,739.
U.S. Appl. No. 14/133,897, Oct. 22, 2014, Issue Notification, U.S. Pat. No. 8,886,739.
U.S. Appl. No. 13/447,932, Sep. 9, 2014, Office Action.
U.S. Appl. No. 13/447,932, Jan. 9, 2014, Response to Office Action.
U.S. Appl. No. 13/447,932, Mar. 19, 2015, Notice of Allowance.
PCT/US2013/036723 WO, Aug. 20, 2013, International Search Report and Written Opinion.
2006276974, AU, Feb. 8, 2012, Examiner's Report (No. 2).
2006276974, AU, Aug. 3, 2012, Response to Examiner's Report.
2616911, CA, Aug. 23, 2013, Response to Office Action.
EU06750321.9, EU, Jul. 6, 2010, Response to Search Report.
EU06750321.9, EU, Jun. 22, 2012, Response to Examination Report.
382/KOLNP/2008, IN, May 27, 2014, Examination Report.
2008-523868, JP, Nov. 7, 2011, Response to Office Action (English Proposed Arguments and Claim Amendments).
TW095119990, TW, May 8, 2013, English Summary of Arguments and Claims Responding to Examination Report.
U.S. Appl. No. 12/605,885, filed Oct. 26, 2009, U.S. Pat. No. 8,291,026.
U.S. Appl. No. 13/651,909, filed Oct. 15, 2012.
U.S. Appl. No. 13/864,930, filed Apr. 17, 2013.
U.S. Appl. No. 14/033,135, filed Sep. 20, 2013.
U.S. Appl. No. 14/133,875, filed Dec. 19, 2013.
U.S. Appl. No. 14/133,897, filed Dec. 19, 2013.
U.S. Appl. No. 14/572,920, filed Dec. 17, 2014.
U.S. Appl. No. 14/572,932, filed Dec. 17, 2014.
U.S. Appl. No. 14/572,942, filed Dec. 17, 2014.
U.S. Appl. No. 14/572,952, filed Dec. 17, 2014.
U.S. Appl. No. 14/572,966, filed Dec. 17, 2014.
U.S. Appl. No. 14/572,976, filed Dec. 17, 2014.
U.S. Appl. No. 13/651,909, Jun. 8, 2015, Office Action.

(56) References Cited

OTHER PUBLICATIONS

Klensin, J. (ed.). Request for Comment 2821: "Simple Mail Transfer Protocol." The Internet Society. Apr. 2001. Retrieved from https://www.ietf.org/rfc2821.txt, last visited Dec. 11, 2015.
U.S. Appl. No. 13/864,930, Nov. 6, 2015, Office Action.
U.S. Appl. No. 14/572,966, Dec. 3, 2015, Office Action.
U.S. Appl. No. 14/572,920, Dec. 11, 2015, Preliminary Amendment.
U.S. Appl. No. 14/572,932, Dec. 9, 2015, Preliminary Amendment.
U.S. Appl. No. 14/572,976, Dec. 10, 2015, Preliminary Amendment.
Klensin, J. (ed.). Request for Comment 2821: "Simple Mail Transfer Protocol." The Internet Society. Apr., 2001. Retrieved from https://www.ietf.org/rfc/rfc2821.txt, last visited Dec. 11, 2015.
Wroblewski, Luke. "Web Application Form Design." Jan. 22, 2005. Retrieved from http://www.lukew.com/ff/entry.asp?1502, last visited Dec. 11, 2015.
Eide Kristian. "The Next Generation of Mail Clients." LWN.net. Feb. 25, 2004. Retrieved from https://lwn.net/Articles/72937/, last visited Dec. 11, 2015.
Garrett, Jesse James. "Yahoo! Mail: Simplicity Holds Up Over Time." BoxesandArrows.com. Mar. 11, 2002. Retrieved from http://boxesandarrows.com/yahoo-mail-simplicity-holds-up-over-time/, last visited Dec. 11, 2015.
Jarrett, Caroline. "Designing Usable Forms: The Three Layer Model of the Form." Effortmark. Excerpt from St. Francis Leprosy Guild Forms. 2000.
Spolsky, Joel. "User Interface Design for Programmers." Apress. 2001.
Garrett, Jesse James. "Yahoo! Mail." Dec. 28, 2001. From BoxesandArrows.com.
GSM Application Style Guide. Openwave Systems Inc. Feb. 2001.
Starling, Andrew. "Usability and HTML Forms." ecommerce-guide.com. Dec. 11, 2001. Retrieved from http://www.ecommerce-guide.com/solutions/building/article.php/938071/Usability-and-HTML-Forms.htm, last visited Dec. 11, 2015.
U.S. Appl. No. 14/572,942, Dec. 17, 2015, Preliminary Amendment.
U.S. Appl. No. 14/572,952, Dec. 17, 2015, Preliminary Amendment.
U.S. Appl. No. 14/572,976, Dec. 16, 2015, Office Action.
U.S. Appl. No. 14/572,932, Dec. 17, 2015, Office Action.
U.S. Appl. No. 14/572,942, Dec. 22, 2015, Office Action.
U.S. Appl. No. 14/572,952, Dec. 23, 2015, Office Action.
U.S. Appl. No. 14/572,966, Dec. 23, 2015, Office Action.
U.S. Appl. No. 13/651,909, Dec. 21, 2015, Notice of Abandonment.
U.S. Appl. No. 14/572,920, Jan. 15, 2015, Response to Office Action with.
U.S. Appl. No. 14/572,932, Jan. 15, 2015, Response to Office Action with.
U.S. Appl. No. 14/572,942, Jan. 15, 2015, Response to Office Action with.
U.S. Appl. No. 14/572,952, Jan. 15, 2015, Response to Office Action with.
U.S. Appl. No. 14/572,966, Jan. 15, 2015, Response to Office Action with.
U.S. Appl. No. 14/572,976, Jan. 15, 2015, Response to Office Action with.

\* cited by examiner

REDUCED TRACEABILITY ELECTRONIC MESSAGE SYSTEM AND METHOD

RELATED APPLICATION DATA

This application is a continuation-in-part of U.S. patent application Ser. No. 12/605,885, filed Oct. 26, 2009, and titled "Reduced Traceability Electronic Message System and Method," which is a continuation application of U.S. patent application Ser. No. 11/401,148, filed Apr. 10, 2006, and titled "Reduced Traceability Electronic System and Method," each of which is incorporated by reference herein in its entirety. This application also claims the benefit of priority of U.S. Provisional Patent Application Ser. No. 60/703,367, filed Jul. 28, 2005, and titled "Method and System for Reducing Traceability of Electronic Messages," which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention generally relates to the field of electronic messaging. In particular, the present invention is directed to a reduced traceability electronic message system and method.

BACKGROUND

Typically, an electronic message between two people is not private. It may travel along a public network, such as the Internet, and be susceptible to interception by unintended third parties. Messages are also logged and archived by the communication systems themselves. They may also be copied, cut, pasted, printed, forwarded, blind copied, or otherwise manipulated. This may give a message a "shelf-life" that is often uncontrollable by the sender or even the recipient. Surreptitious logging (e.g., by keystroke and message recording software) may occur by third parties that have gained unauthorized access to either the computer of the sender and/or the recipient. Electronic messages include the message content itself coupled to identifying information regarding the sender, the recipient, the location of the message, times and dates associated with the message, etc. This allows a third party that is logging messages, intercepting messages, or simply gaining access to the messaging system's logs or inbox archives to associate the potentially important identifying information (typically referred to as header information) with the message content. These are only some of the ways in which electronic messages can be misused. There is a demand for a system and method for reducing the traceability of electronic messages.

SUMMARY OF THE DISCLOSURE

In one implementation, a computer-implemented method of reducing traceability of an electronic message having header information and a message content is provided. The method includes providing at a first computer a first display image screen having a first portion for entering an address of a recipient of an electronic message and a second portion for entering a message content; receiving at the first computer an input of a recipient address via the first portion; transmitting the recipient address from the first computer; receiving at the first computer the message content via the second portion, wherein the recipient address and the message content are not displayed on the first display image screen at the same time; and transmitting the message content from the first computer, wherein the message content is transmitted from the first computer separately from the recipient address.

In another implementation, a computer readable hardware storage medium containing computer executable instructions implementing a method of reducing traceability of an electronic message is provided. The instructions includes a set of instructions for providing at a first computer a first display image screen having a first portion for entering an address of a recipient of an electronic message and a second portion for entering a message content; a set of instructions for receiving at the first computer an input of a recipient address via the first portion; a set of instructions for transmitting the recipient address from the first computer; a set of instructions for receiving at the first computer the message content via the second portion, wherein the recipient address and the message content are not displayed on the first display screen at the same time; and a set of instructions for transmitting the message content from the first computer, wherein the message content is transmitted from the first computer separately from the recipient address.

In yet another implementation, a system for reducing traceability of an electronic message is provided. The system includes a means for providing at a first computer a first display image screen having a first portion for entering an address of a recipient of an electronic message and a second portion for entering a message content; a means for receiving at the first computer an input of a recipient address via the first portion; a means for transmitting the recipient address from the first computer; a means for receiving at the first computer the message content via the second portion, wherein the recipient address and the message content are not displayed on the first display screen at the same time; and a means for transmitting the message content from the first computer, wherein the message content is transmitted from the first computer separately from the recipient address.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The present disclosure provides a system and method reducing traceability of an electronic message. In one embodiment, header information and message content of an electronic message are displayed by a system and method of the present disclosure so that header information and message content are not displayed at the same time. As will be clear to one skilled in the art from the disclosure below, separation of header information from message content reduces the traceability of the electronic message. To further reduce traceability of an electronic message, header information may be automatically deleted at a first predetermined time and message content may be automatically deleted at a second predetermined time (e.g., after message content is viewed). In one example, the first and second predetermined times may occur sequentially (e.g., deleting header information upon displaying message content and deleting message content upon closing a display of message content), simultaneously (e.g., deleting message content and associated header information upon closing a display of message content), or out of order such that the second predetermined time occurs before the first predetermined time (e.g., displaying message content first, deleting message content, displaying header information, then deleting header information). These and other aspects of the present disclosure will be described in greater detail below with respect to various exemplary embodiments illustrated in FIGS. 1 to 17.

Figure 1:
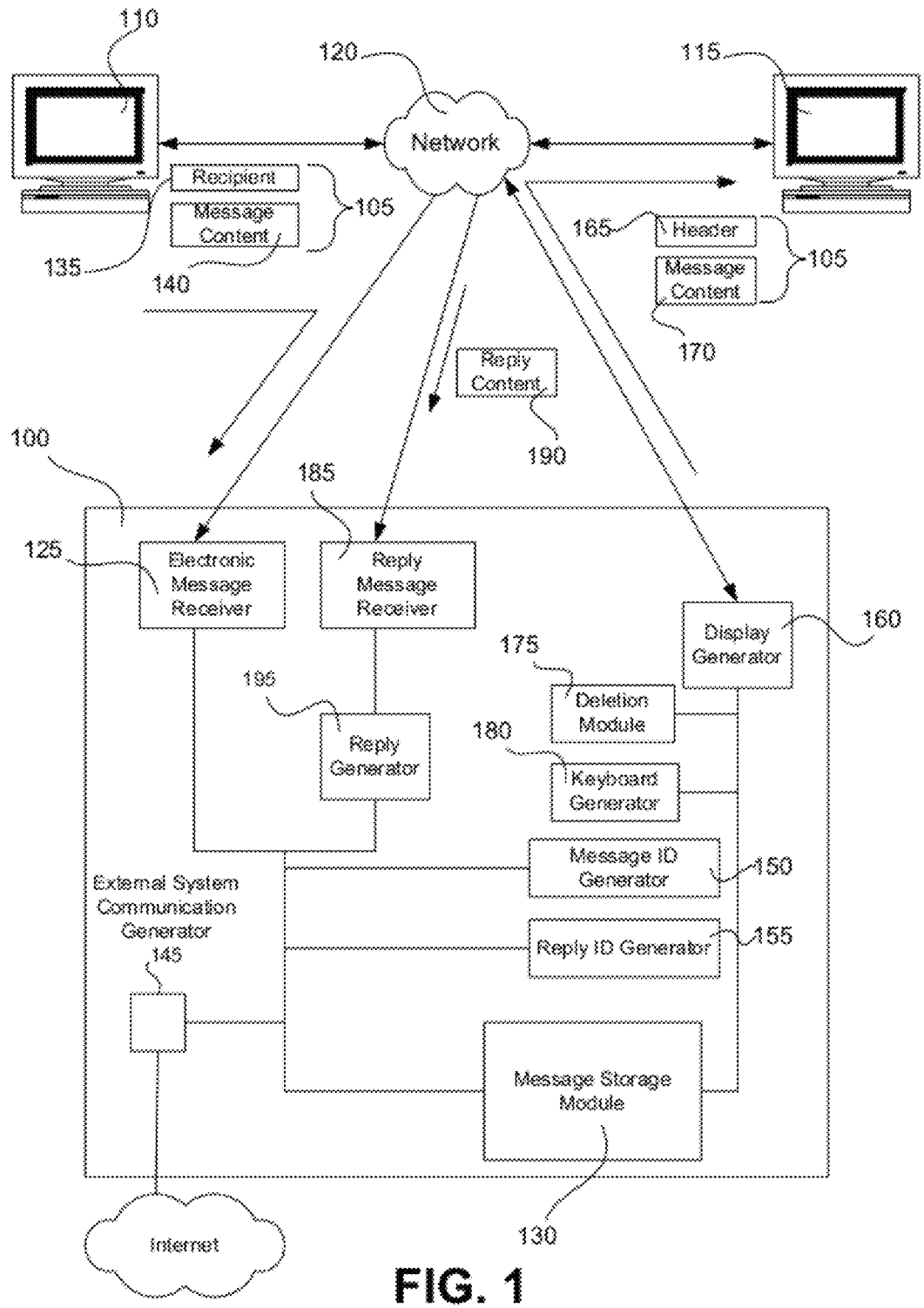
FIG. 1 illustrates one example of a schematic diagram of an exemplary system for electronic messaging depicting an initial electronic message being communicating from one user to another.

FIG. 1 illustrates one embodiment of a system 100 for electronic messaging depicting an electronic message 105 being sent from one user to another. System 100 may include any number of computers, such as the two user computers 110 and 115, coupled to a network 120. Network 120 facilitates communication between computer 110 and computer 115. In one example, system 100 may be a closed system that may utilize open network structures (e.g., the Internet) for communication with users, but that does not utilize open or third-party messaging systems (e.g., industry standard email) that may increase the chance of message logging and impact the recordless nature of an electronic message of the present disclosure. System 100 allows users of computers 110 and 115 to communicate with each other via one or more electronic messages, such as electronic message 105 over network 120. As will be described in further detail hereinafter, several aspects of system 100 reduce traceability of electronic messages, such as electronic message 105. In one example, electronic message 105 is automatically deleted from system 100 after it is viewed by the recipient to ensure that electronic message 105 cannot be forensically recreated and to ensure there is no record of electronic message 105 ever existing on system 100 thereafter.

Although computers 110 and 115 are illustrated as workstation computers, any well known computer may be utilized in creating and/or viewing electronic messages. Example computers include, but are not limited to, a personal computer, a workstation computer, a server computer, a laptop computer, a handheld device, a mobile telephone, a personal digital assistant (PDA), another computing device capable of communicating an electronic message via network 120, and any combinations thereof. System 100 may include one or more server computers. In one example, system 100 may reside substantially on a single server computer. In another example, system 100 may be distributed across two or more server computers. In yet another example, system 100 may be distributed across a plurality of user computers without a server computer, such as in a peer-to-peer environment. In one such example, components of a messaging system according to the present disclosure and/or their functionality (e.g., storage of header information and message content, display generation, reply generation, etc.) may occur at a recipient's user computer In still another example, system 100 may be distributed across one or more server computers and one or more user computers. One or more relay servers or other systems may be utilized between server computers and/or user computers.

Figure 2:
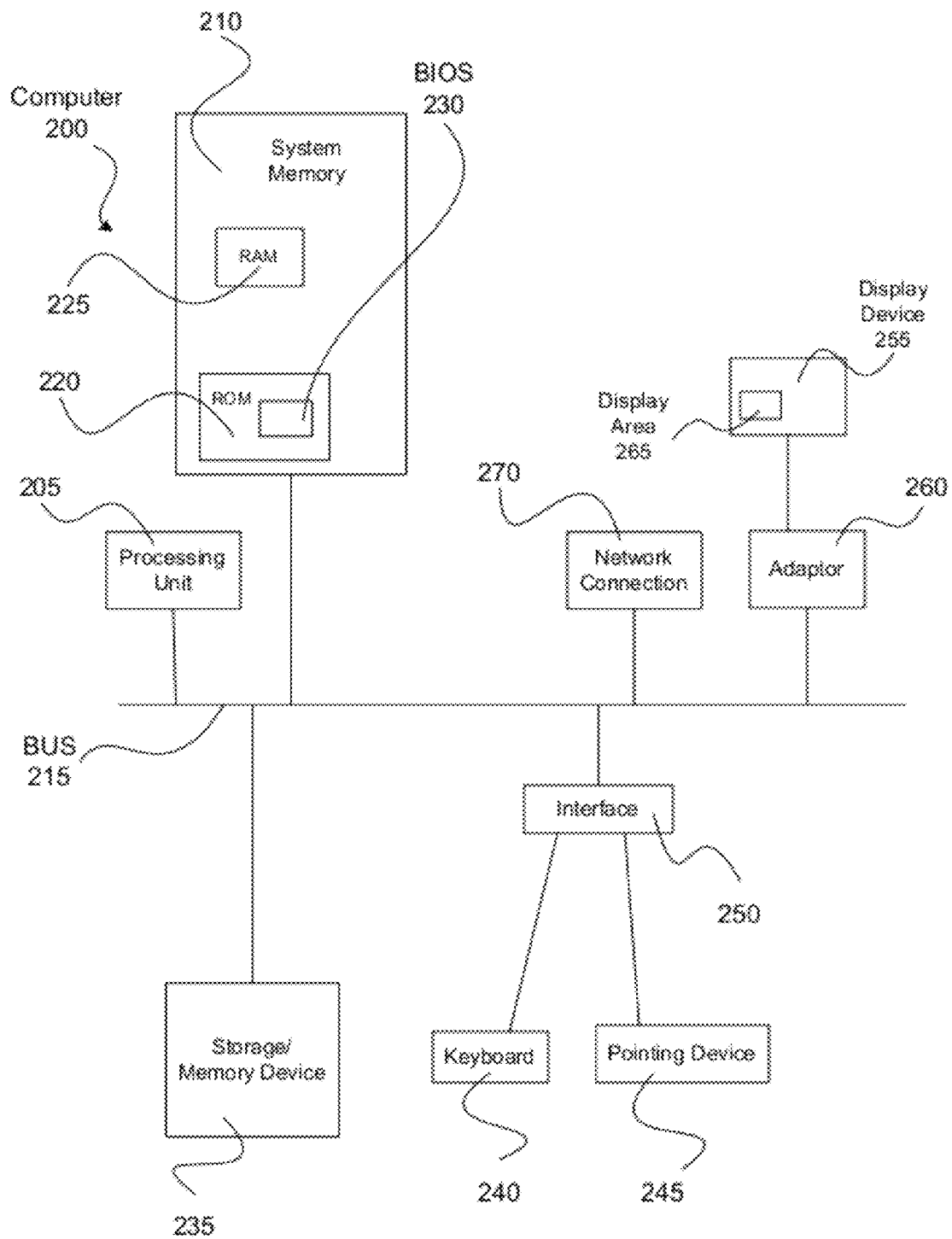
FIG. 2 illustrates one example of a computer environment that may be utilized to implement various aspects of the present disclosure.

FIG. 2 illustrates one example of a computing environment in the exemplary form of a computer 200 within which a set of instructions, for causing the computer to perform any one of the methodologies of the present disclosure, may be executed. Computer 200 may include a processing unit 205, a system memory 210, and a system bus 215 that couples various components including system memory 210 to processing unit 205. System bus 215 may be any of several types of bus structures including, but not limited to, a memory bus, a memory controller, a peripheral bus, a local bus, and any combinations thereof, using any of a variety of bus architectures. System memory 210 may include a read only memory (ROM) 220 and a random access memory (RAM) 225.

A basic input/output system 230 (BIOS), including basic routines that help to transfer information between elements within computer 200, such as during start-up, may be stored in ROM 220. Computer 200 may also include a storage/memory device 235 for reading and/or writing information. Example storage devices include, but are not limited to, a hard disk drive for reading from and/or writing to a hard disk, a magnetic disk drive for reading from and/or writing to a removable magnetic disk, an optical disk drive for reading from and/or writing to an optical media (e.g., a compact disc), and any combinations thereof. Storage/memory device 235 may be connected to bus 215 by an interface. In one example, storage/memory device 235 and associated computer-readable media provide nonvolatile storage of computer readable instructions, data structures, program modules, and/or other data for computer 200. It will be appreciated by those skilled in the art that other types of computer-readable media that can store data that is accessible by a computer in a volatile and/or non-volatile manner may also be used in an example operating environment. Examples of other types of computer-readable media include, but are not limited to, a magnetic cassette, a flash memory media (e.g., a card and a thumb-drive), a digital video disk, a Bernoulli cartridge, a random access memory (RAM), a read only memory (ROM), and any combinations thereof. A computer-readable medium, as used herein, is intended to include a single medium as well as a collection of physically separate media, such as, for example, a collection of compact disks or one or more hard disk drives in combination with a computer memory.

A number of program modules can be stored on storage/memory device 235, including, but not limited to, an operating system, one or more application programs, other program modules, program data, computer implemented instructions for carrying out the system and methodologies of the present disclosure, and any combinations thereof. A user may enter commands and information into computer 200 through one or more input devices, such as a keyboard 240 and/or a pointing device 245. Other examples of an input device include, but are not limited to a microphone, a joystick, a game pad, a satellite dish, a scanner, and any combinations thereof. These and other input devices may be connected to processing unit 205 through an interface 250 that is coupled to bus 215. Example interfaces for connecting an input device include, but are not limited to, a serial interface, a parallel interface, a game port, a universal serial bus (USB), an IEEE 1394 (Firewire) interface, a direct interface to system bus 215, and any combinations thereof.

A display device 255 may be connected to system bus 215 via an interface, such as a display generator/video adaptor 260. Example display devices include, but are not limited to, a cathode-ray tube (CRT) monitor, a plasma display, an LCD display, and any combinations thereof. In addition to a display device, a computer may include one or more other peripheral output devices, such as a speaker and a printer. A pen digitizer and an accompanying pen/stylus may be included in order to digitally capture freehand input. A pen digitizer may be separately configured or coextensive with a display area 265 of display device 255. Accordingly, a pen digitizer may be integrated with display device 255, or may exist as a separate device overlaying or otherwise appended to display device 255.

Computer 200 may include a network connection 270 for connecting to one or more of a variety of networks, such as network 120 of FIG. 1, and remote computer devices thereon. Example network connections may include, but are not limited to, a network interface card, a modem, and any combinations thereof. Example networks include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 120 may employ a wired and/or a wireless mode of communication. In general, any network topology may be used. It will be appreciated that FIG. 1 depicts only one instance of a system 100, and that other instances may be created where one or more computers utilize system 100. One or more communication protocols may be utilized with system 100 and/or with network 120. Example protocols include, but are not limited to, TCP/IP, Ethernet, FTP, HTTP, HTTPS, and any combinations thereof. In one example, a user of a computer, such as computers 110, 115 may access system 100 (e.g., on one or more server computers) utilizing a secure protocol as is well-known. A user computer, such as computers 110, 115 may utilize one or more software applications and/or one or more system based applications in communicating with system 100. Example software applications include, but are not limited to, a web browser (e.g., INTERNET EXPLORER, MOZILLA, and NETSCAPE), Java (e.g., J2ME), BREW, a direct access client (e.g., CITRIX), and any combinations thereof. Example system applications include, but are not limited to, MICROSOFT WINDOWS, UNIX, LINUX, APPLE operating system, X-WINDOWS, COCOA, POCKETPC, and PALM.

Referring to FIG. 1 an exemplary electronic message 105 is communicated by a sending user utilizing computer 110 to system 100 for further communication to a recipient user. Exemplary system 100 includes an electronic message receiver 125 for receiving one or more electronic messages, such as electronic message 105. Electronic message receiver 125 is in communication with an electronic message storage module 130. An electronic message storage module, such as electronic message storage module 130, stores electronic messages received by electronic message receiver 125 utilizing one or more particular data storage methodologies. Many data storage methodologies will be recognized by those skilled in the art and those chosen for use with an electronic message storage module according to the present disclosure may be based on the particular implementation of the messaging system and method. Example data storage methodologies may include, but are not limited to, one or more tables, a database, a file system, and any combinations thereof. In one example, as will be described in greater detail below, electronic message storage module 130 stores header ("container") information and message content separate from each other to minimize correlation by a third party between identifying information regarding the electronic message (e.g., identification of sender, recipient, date/time of message, location of message) in the header information and the content of the message. In an alternate example, message content and header information may be stored together and separated during display. In one embodiment of the present disclosure, header information and message content are never stored or displayed together. In such a case, a correlation (e.g., a non-identifying message ID described in detail below) may be utilized to associate the two components.

Electronic message 105 as communicated to system 100 in the example of FIG. 1 includes a recipient address 135 and a message content 140. A recipient address, such as recipient address 135 may be an indicator that identifies a particular desired recipient of an electronic message, such as electronic message 105. In one example, a recipient address may be a unique identifier (e.g., a screen name, a login name, a messaging name, etc.) established specifically for use with system 100 at user registration with the system. In another example, a recipient address may be a pre-established electronic mail (email) address, text messaging address, instant messaging address, Short Messaging Service (SMS) address, a telephone number (e.g., a home, work, mobile telephone number), BLACKBERRY personal identification number (PIN), or the like, that is associated with the recipient and provided by a third-party provider. Example third-party providers include, but are not limited to, a web-based commercial fee and fee-free provider (e.g., YAHOO, HOTMAIL, AMERICA ONLINE, etc.), an Internet service provider (e.g., AMERICA ONLINE, MSN, cable operator, telephone company, etc.), a telephone provider (e.g., VERIZON, CINGULAR, etc.), BLACKBERRY provider, an employer, an educational institution, and other email providers. The third-party address may be chosen by a user as their unique identifier at registration. In an alternative embodiment, a sending user may know a third-party address of an intended recipient and use it as a recipient address when generating electronic message 105. In such an embodiment, it is possible that the intended recipient is not a registered user of system 100. In one example, system 100 may optionally include an external system communication generator 145 configured to send a notification message to the third-party system associated with the recipient address used with electronic message 105. External system communication generator 145 is in communication with the appropriate network for communication with the corresponding third-party address for delivering the notification message. In one example shown in FIG. 1, external system communication generator 145 is shown connected to the Internet. In one example, a notification message may include an indication that someone has sent the desired recipient an electronic message on system 100 and that the intended recipient may register to use system 100. The notification message may include directions (e.g., a hyperlink) to a publicly available portion of system 100 for registration.

An electronic message may be any electronic file, data, and/or other information transmitted between one or more user computers. An electronic message may include (e.g., as part of a message content) any of a wide variety of information including, but not limited to, text, an image, video (e.g., single play video utilizing an application, such as MACROMEDIA FLASH), binary, tabular data (e.g., a spreadsheet), rich text including variable font color, tables, etc.), audio (e.g., single play audio utilizing an application, such as MACROMEDIA FLASH), other types of data, and any combinations thereof. In one example, a message content of an electronic message may include embedded information. In another example, a message content of an electronic message may include an attached and/or linked file. In such an example with an attached and/or linked file, the attached and/or linked file may be automatically deleted from the messaging system after being viewed by a recipient. Typically, a message content, such as message content 140 does not include information that in itself identifies the message sender, recipient, location of the electronic message, or time/date associated with the electronic message.

System 100 may optionally include a message ID generator 150. As described in further detail below, message ID generator 150 may generate a message ID for each electronic message received by system 100. The message ID is associated with the corresponding message. A message ID is used to associate a container (i.e., header) information with a corresponding separately-stored message content. In one example, a message ID may be created using a unique 128 bit, randomly generated number. System 100 may include a correlation between header information and message content in a variety of ways including, but not limited to, a database, a lookup table, an entry in a file system, and any combinations thereof. Utilizing a message ID associated with an electronic message, such as electronic message 105, system 100 may handle (e.g., store, deliver, display, etc.) a header information and a message content of a particular electronic message separately with the ability to correlate the two at a later time. Thus, a message content may be handled without any of the identifying header information. A message ID may contain unique and/or non-unique information. For example, a message ID may include a sequence number (e.g., 1, 2, 3, 4, etc.) identifying a number of a message amongst a group of messages. A sequence number may be re-used. For example, when an electronic message with a sequence number of "1" is viewed and subsequently deleted, sequence numbers for remaining electronic messages may be adjusted so that the electronic message having sequence number "2" is renumbered to number "1" and so forth. In another example, a message ID may include a sequence number and a unique user identifier (e.g., a user ID, a login ID, etc.).

System 100 may optionally include a reply ID generator 155. As described further below, reply ID generator 155 generates a reply ID for each electronic message received by system 100. The reply ID associates an electronic message, such as electronic message 105, with the sender of the electronic message. In one example, a reply ID may include no information that in itself would identify a sender of an electronic message to a third party that does not have access to the correlation maintained by the messaging system. System 100 may include a correlation between a reply ID and a corresponding message sender in a variety of ways, including, but not limited to, a database, a lookup table, an entry in a file system, and any combinations thereof. In one aspect, a reply ID associated with an electronic message allows the header information and/or the message content of the electronic message to include no information about the sender of the message that itself provides a traceable identity of the sender. As described in more detail below, a recipient may still send a reply electronic message to the original sender. Additionally, a third-party that may intercept, log, or otherwise come in possession of the header information and/or the message content will not be able to trace the electronic message to the sender without also gaining access to the correlation maintained by system 100. A reply ID may include a variety of different identifiers that allow a messaging system, such as system 100, to direct a reply electronic message back to a sender of the original electronic message. In one example, a reply ID may be created using a randomly generated number (e.g., a 128 bit, randomly generated number).

System 100 includes a display generator 160 in communication with electronic message storage module 130. Display generator 160 is configured to provide information representing a display image for display on a user computer, such as user computers 110, 115. Example display images include, but are not limited to, a user login display, a display listing information representing available electronic messages for viewing, a display for entering an electronic message, a display of a message content of an electronic message, a display for entering a reply electronic message, and any combinations thereof. In one example, display generator 160 may be configured to utilize a message ID in generating a first information 165 representing a first display image including at least some of the header information for electronic message 105. Display generator 160 may also be configured to generate a second information 170 representing a second display image including message content 140 of electronic message 105. FIG. 1 illustrates first and second information 165, 170 communicated with computer 115 for display to a recipient user. In this example, display generator 160 generates first and second information 165, 170 in a manner that does not allow the first and second display images to be displayed at the same time. Separate display of header information and message content for an electronic message reduces traceability of the electronic message. In one aspect, screenshot logging at a computer, such as computer 115, may not capture both header information and message content simultaneously. Additionally, separation of header information and message content physically and/or temporally during communication to a user computer over an open network, such as the Internet, can thwart misuse of the electronic message by reducing the ability of intercepting both components of the electronic message.

Display generator 160 may utilize any of a variety of well known display generation methodologies and/or protocols for creating information representing a displayable image. Example methodologies/protocols include, but are not limited to, hypertext markup language (HTML), extensible markup language (XML), direct graphic generation, and any combinations thereof. In one example, system 100 resides on one or more server computers and display generator 160 includes and/or utilizes a web server application to generate information representing web-browser-displayable images that may be viewed by a user computer including a web browser. In another example, display generator 160 may be configured to instruct a browser or other application of a user computer displaying a display image according to the present invention to not cache any of the information related to the display image.

System 100 may further include a deletion module 175 in communication with electronic message storage module 130. Deletion module 175 is configured to delete header information and/or message content from system 100 after a predetermined amount of time. In one example, deletion module 175 is configured to automatically delete header information and corresponding message content immediately after the message content is displayed. In another example, a deletion module (e.g., deletion module 175) is configured to automatically delete header information upon display of a corresponding message content. In yet another example, a deletion module (e.g., deletion module 175) is configured to automatically delete message content upon a display of the message content being closed. In still another example, a deletion module is configured to automatically delete header information and/or message content, whether or not they have been viewed, after a predetermined time (e.g., twenty-four hours after being received). In still yet another example, a deletion module is configured to automatically delete header information and/or message content a predetermined time (e.g., twenty-four hours) after first being displayed. In a further example, a predetermined amount of time may include a predetermined number of viewings (other than a single viewing) of a particular electronic message (e.g., an electronic message is deleted after 20 views). In still a further example, a deletion module (e.g., deletion module 175) is configured to automatically delete header information upon display of a corresponding message content and to automatically delete message content upon a display of the message content being closed. Combinations of deletion protocols, such as these examples, are also contemplated.

In an alternate embodiment, system 100 may include a display-based keyboard generator 180. Display-based keyboard generator 180 is configured to generate a display-based keyboard that may be included with a display image generated by display generator 160. A display-based keyboard can be utilized by a user (e.g., through mouse click or touch screen depression) to input information (e.g., username, password, recipient address, message content) without the use of the standard keyboard associated with the user computer. In this way interception by keyboard (keystroke) logging hardware and/or software resident on the user computer, such as computers 110, 115, can be avoided. In one example, a display-based keyboard generator may utilize FLASH technology commercially available from Macromedia Inc. In another example, a display-based keyboard generator may utilize Java technology commercially available from Sun Microsystems. In one aspect a FLASH-based keyboard may randomly place spaces between characters in the on-screen keyboard to further prevent interception of the message. Although this is a relatively slow data entry method, a user can be more assured that their information is not being logged and/or intercepted.

System 100 may also optionally include a reply message receiver 185. Reply message receiver 185 is configured to receive a reply message to one or more original electronic messages viewed by a recipient. In one aspect, a sender of an original electronic message may be determined from an identifying characteristic included, or associated, with the electronic message. Example identifying characteristics include, but are not limited to, a reply ID, an email address, a username, a display name, login ID, and any combination thereof. In one example, a reply ID of the original electronic message may be utilized in generating a reply message. In one example, a reply message as communicated by computer 115 to system 100 need only include a message content 190. System 100 may include a reply generator 195. Reply generator 195 may be configured to utilize the original reply ID to associate message content 190 and any corresponding header information with the original electronic message sending user. Message ID generator 150 may be configured to generate a message ID for the reply electronic message (i.e., message content 190 and corresponding header information). Reply ID generator 155 may be configured to generate a new reply ID for the reply message and electronic message storage module 130 may store message content 190 and corresponding header information separately for later display to the user (original sender).

Figure 3:
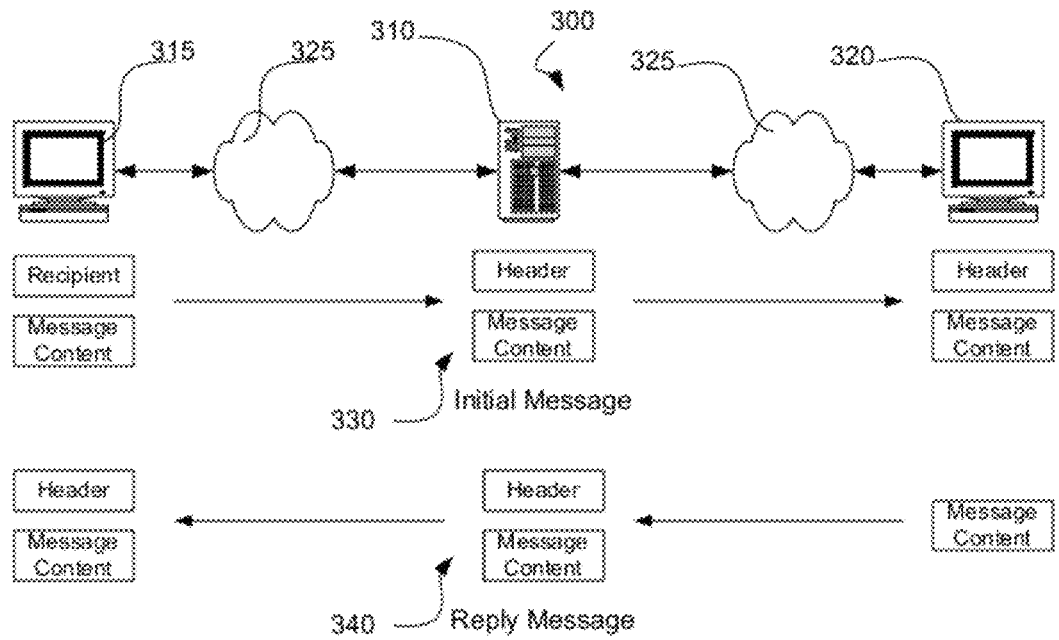
FIG. 3 illustrates another example of a schematic diagram of another exemplary system and method of the present disclosure.
Figure 4:
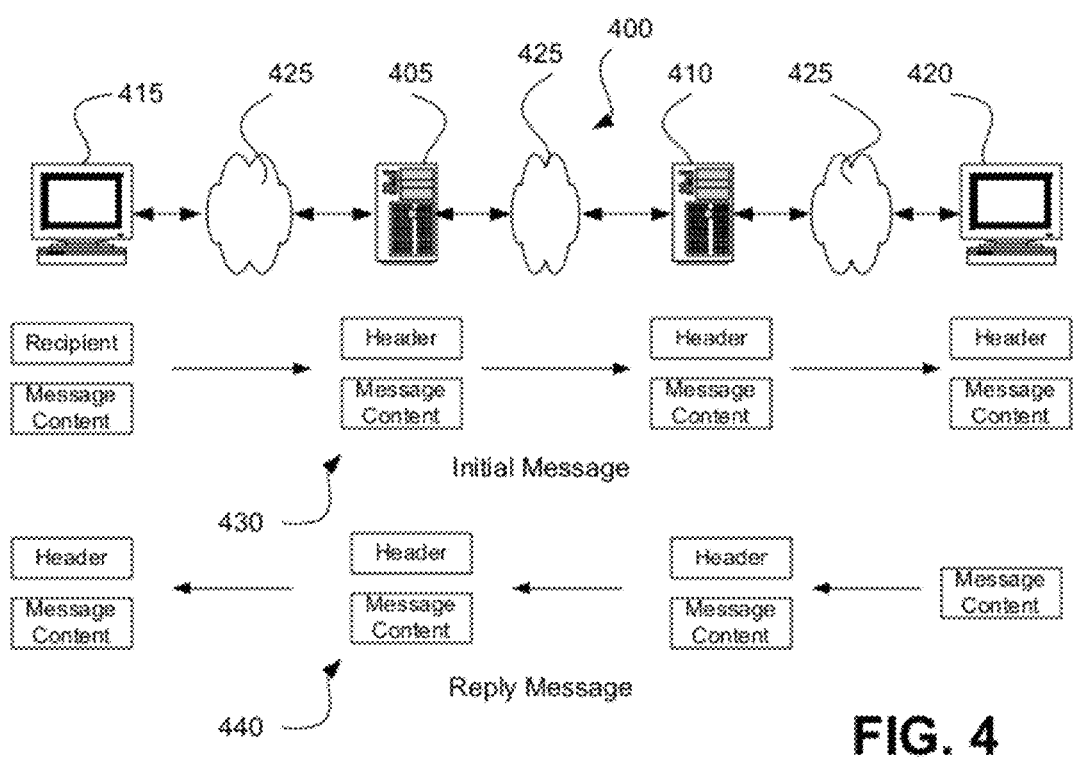
FIG. 4 illustrates another example of a schematic diagram of another exemplary system and method of the present disclosure.

FIG. 1 illustrates only an exemplary embodiment of a messaging system and networking environment according to the present disclosure. As will be appreciated by those skilled in the art and as described herein, variations to system 100 and the network environment may be utilized in implementing the various aspects and methodologies of the present disclosure. FIGS. 3 and 4 illustrate alternate computing environments. FIG. 3 illustrates one embodiment of a messaging system 300 according to the present disclosure. System 300 includes a computing environment having a single server computer 310. User computers 315 and 320 communicate with server computer 310 via network 325. An electronic message 330 is communicated utilizing system 300. A reply electronic message 340 is also illustrated. FIG. 4 illustrates another embodiment of a messaging system 400 according to the present disclosure. System 400 includes a computing environment having two server computers 405, 410. User computers 415 and 420 communicate with server computers 405, 410 via network 425. An electronic message 430 is communicated utilizing system 400. A reply electronic message 440 is also illustrated. Server computers 405, 410 together perform the functionality of the single server computer 310 of FIG. 3.

Figure 5:
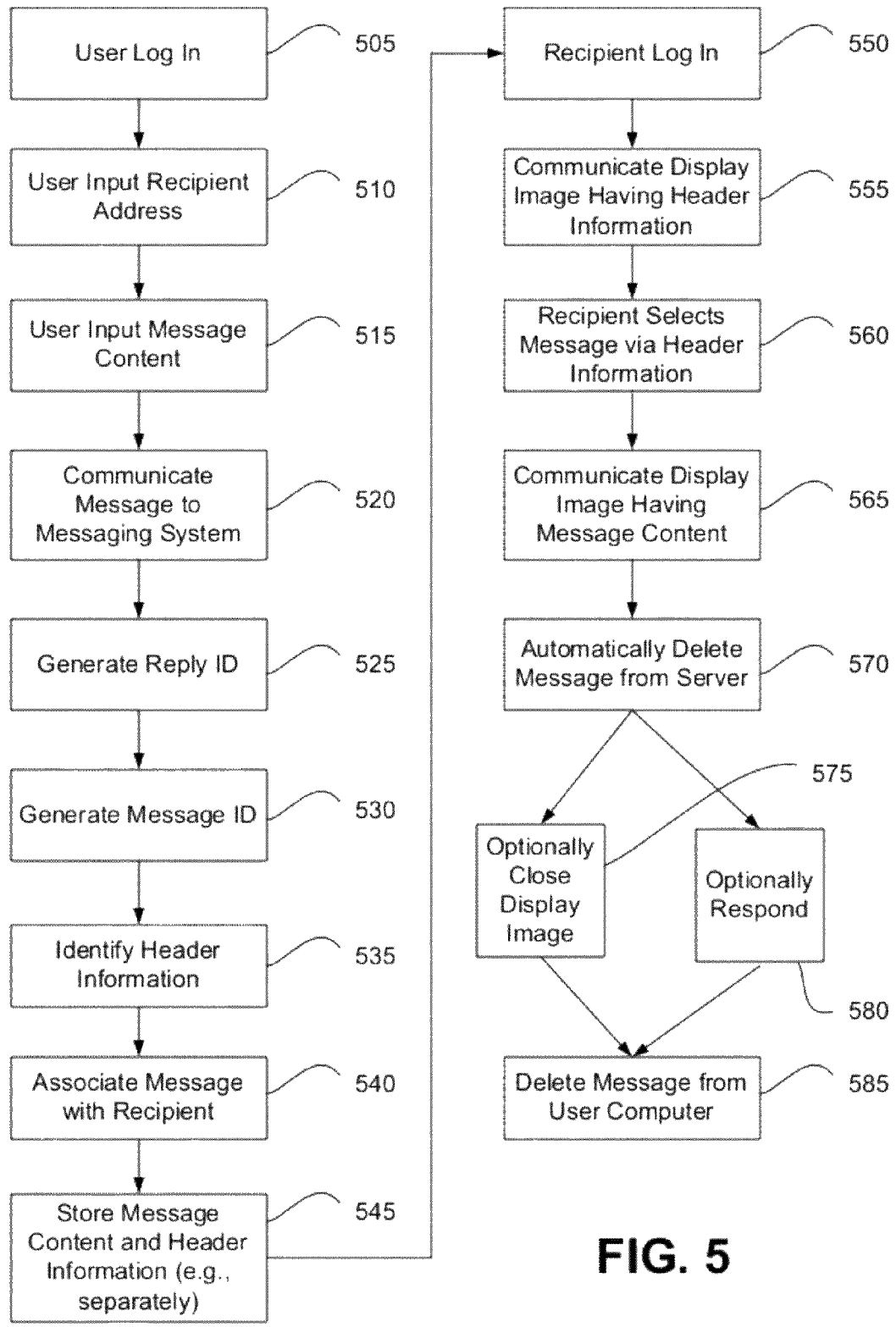
FIG. 5 illustrates one example of a flow chart depicting one exemplary method according to the present disclosure.
Figure 7:
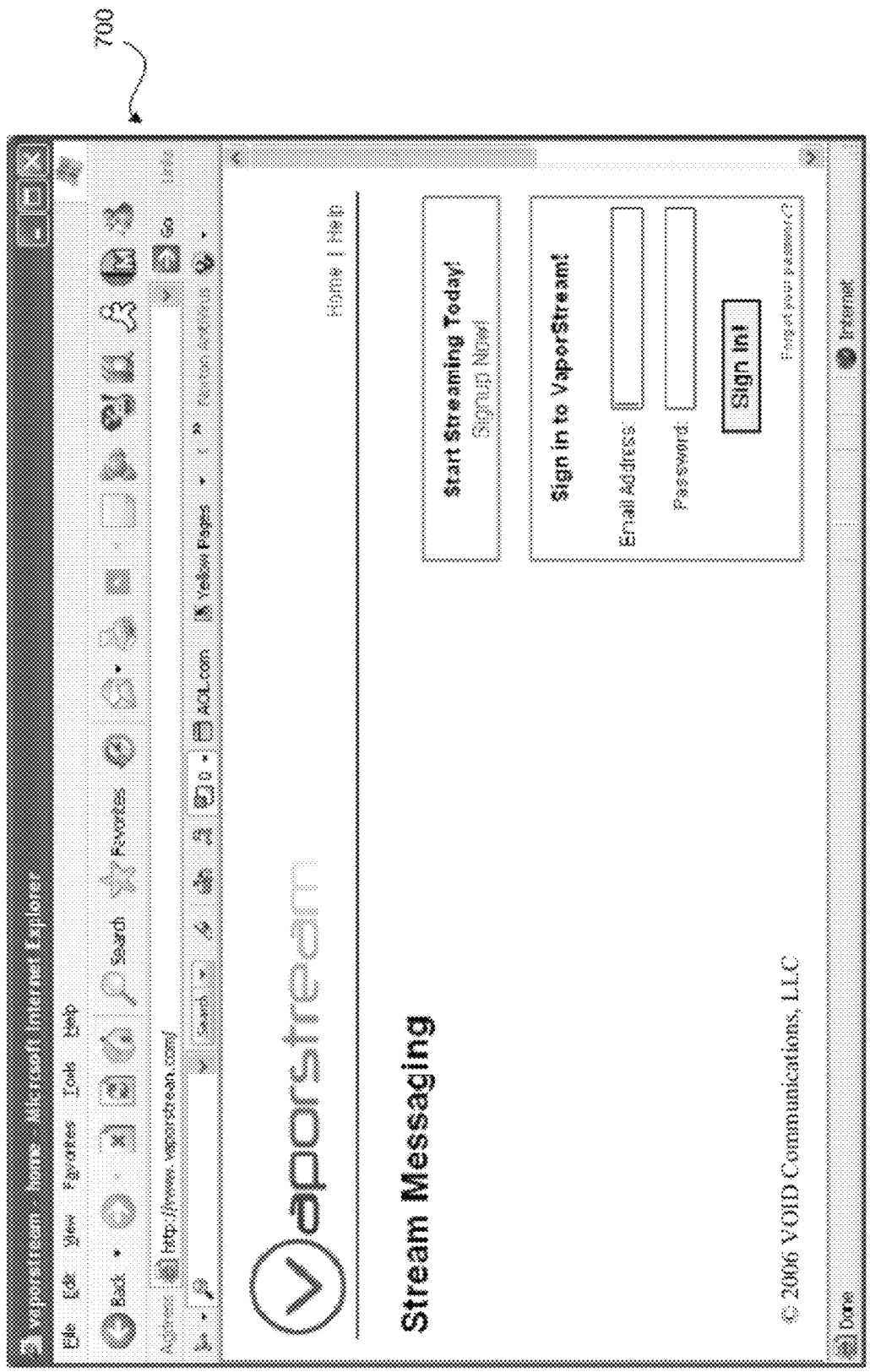
FIG. 7 depicts an exemplary login display image.

Referring to FIGS. 3 and 5, an exemplary operation of a messaging system according to the present disclosure, such as system 300, can be described. A user may log into system 300 at computer 315 (step 505 of FIG. 5). For example, a user may access a web site or other networked interface associated with server 310. Server 310 may then provide information representing a display image (e.g., a web page) for display on computer 315 that allows the user to log into the system. In one aspect, a user of system 300 may have associated therewith a login ID and password for logging into system 300. FIG. 7 depicts an example login display 700 that may be used. In one aspect, system 300 may provide an instruction to a browser or other application on computer 315, or other computer viewing a display image according to the present disclosure, to not cache the information contained in the display image. Upon entry of a valid login ID and password, server 310 establishes a communications link with computer 315 (e.g., a key infrastructure, secure sockets layer (SSL), secure HTTP (HTTPS) or other secure or non-secure communications link). In one example, system 300 may utilize an email address as a login ID.

In one aspect, while a user is logged into system 300, a session may be established including the establishment of a session ID. A session and a corresponding memory may be utilized by system 300 to maintain certain information regarding the session and the user (e.g., user's identification information, a reply ID).

Figure 8:
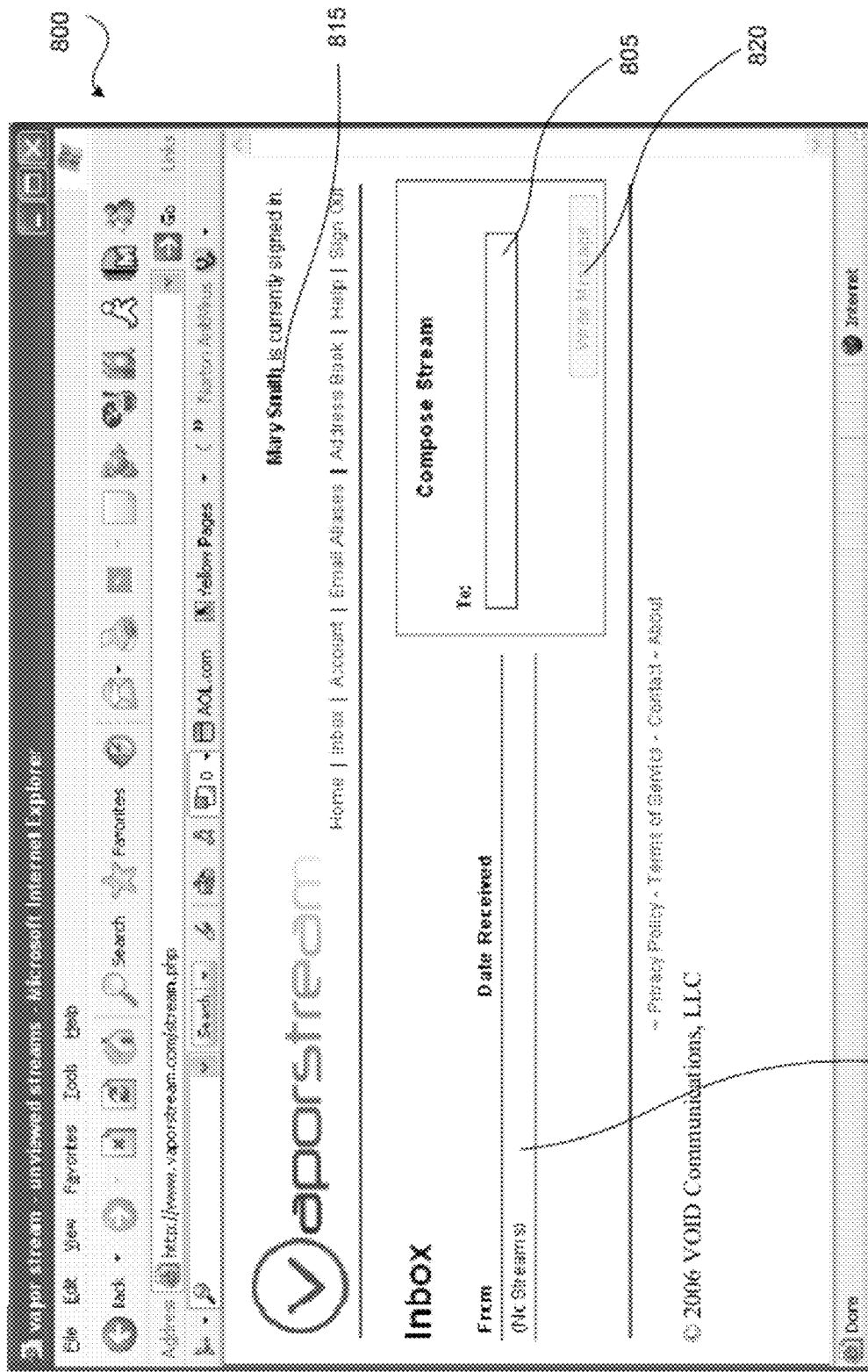
FIG. 8 depicts an exemplary display image including a recipient address input portion.

Upon proper login, the user may be presented with a session starting display image. One of skill in the art will appreciate that a variety of starting display images (i.e., pages) may be available for display to a user upon initial login to system 300. In one example, a display image for inputting an electronic message may be displayed. FIG. 8 illustrates one example of a starting display image 800. Display image 800 includes a first portion 805 for entering a recipient address or other identifier for one or more recipients of a message. Display image 800 also illustrates an "inbox" portion 810 for listing unread electronic messages on the system for the logged in user. In this example, an optional display name 815, "Mary Smith" for the logged in user is displayed. A display name may be the same or different from a corresponding login name and/or user address, and may or may not include identifying information regarding the user.

Figure 9:
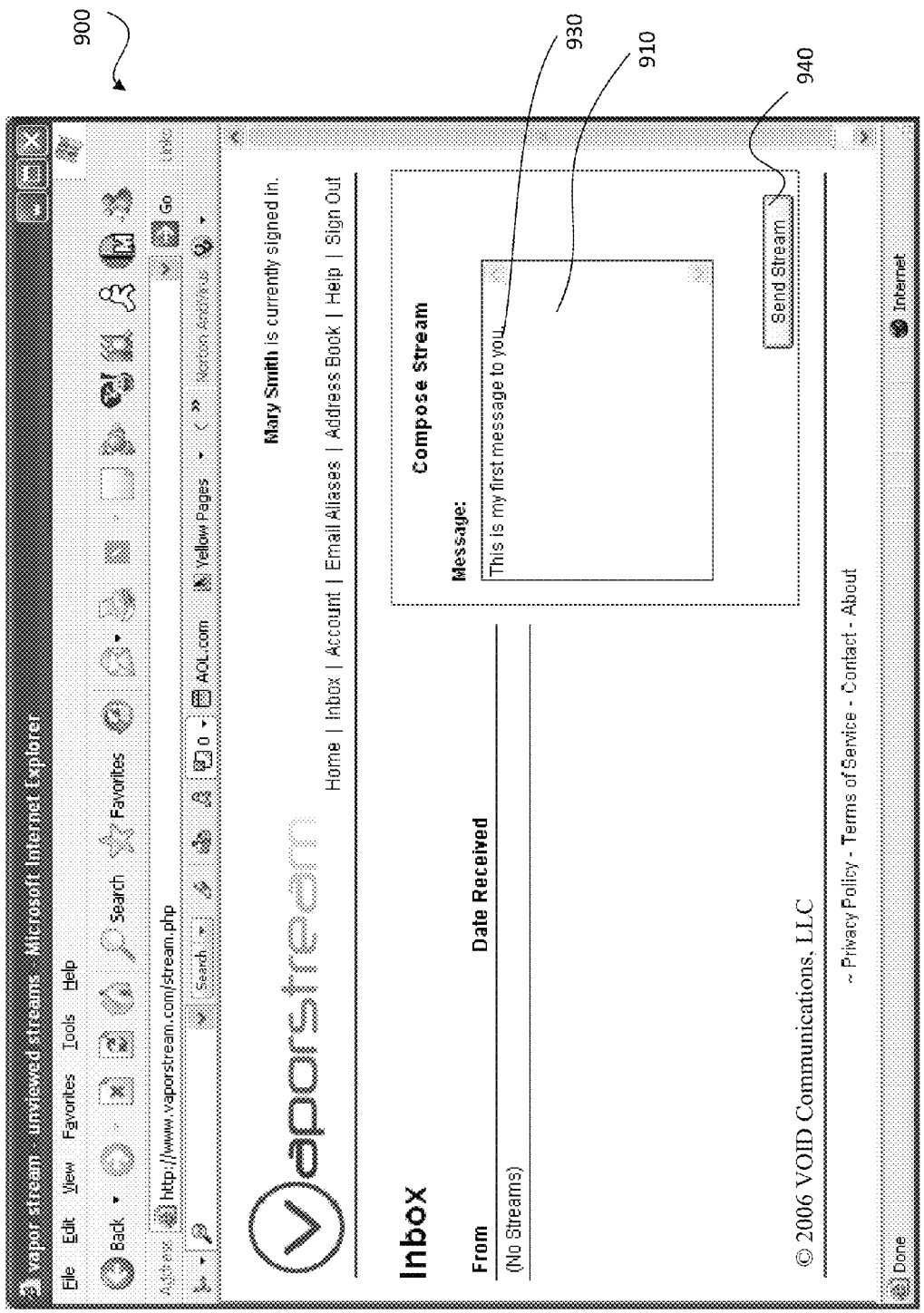
FIG. 9 depicts an exemplary display image including an electronic message content input portion.

Upon entering a recipient address (step 510 of FIG. 5) and activating a button 820 or other trigger, a message content display screen, such as message content display screen 900 of FIG. 9 may be displayed. Display screen 900 includes a first portion 910 for inputting (step 515 of FIG. 5) a message content corresponding to the recipient address input at portion 805 of FIG. 8. In this example, the recipient address and the message content are entered on separate display screens. In another example, the recipient address and message content may be input on a single display image screen. Separation of the entry of the recipient address and message content further reduces the traceability of an electronic message by, in part, reducing the ability of logging at computer 315.

In an alternative embodiment, a display-based keyboard (as discussed above) may be included in an electronic message input displays, such as display images 700, 800, and 900. A user may use a mouse or other pointing device (e.g., a touchscreen display) to select characters being entered.

FIG. 9 illustrates an example message content 930 having been entered in portion 910. Upon completion of message content entry, a user may select button 940, or other indicator, to communicate message content 930 to server 310 (step 520 of FIG. 5). In one example, the recipient address may be communicated to server 310 separately from a corresponding message content at the time of entry. This may reduce the ability to intercept the entire electronic message during communication to server 310. In another example, the recipient address may be retained at computer 315 until the entry of corresponding message content in a subsequent display image. In one example, upon communication of the recipient address and message content 930, computer 315 retains no trace of the either the recipient address or message content 930. For example, each may exist only in random access memory (RAM), and possibly in virtual memory (e.g., a page file) established in a disk drive, at computer 315 from the time the user types the information until the loading of the next display image at computer 315, after which the information is effectively deleted. Referring to FIG. 3, electronic message 330 is illustrated as including a recipient address and message content that is communicated from computer 315 to server 310.

In an alternate embodiment, upon server 310 receiving electronic message 330, instructions associated with system 300 (e.g., instruction stored at server 310) generates a reply ID and associates the reply ID with electronic message 330 (step 525 of FIG. 5). Server 310 maintains a correspondence between the reply ID and the sending user. In one example, a new reply ID is created for each electronic message regardless of whether the sending user is the same as another electronic message. This enhances the reduced traceability of the electronic message.

In another alternate embodiment, at step 530, system 300 generates a message ID for associating the separated message content and header information of electronic message 330. Server 310 maintains a correspondence between the message content and header information.

At step 535, header information associated with electronic message 330 is identified for separation from message content 930. In one aspect, separation of information that identifies the sending user, recipient user, location of the electronic message, timing of electronic message from the message content may be implemented by associating such information with a container or header information component of the electronic message. In one example, utilization of a reply ID and a message ID can further facilitate the removal of information that itself identifies a sending user or recipient. A display name for the sending user may be generated and associated with the header information. The display name for the user need not be unique, thus maintaining the anonymity of the user when electronic message 330 is ultimately communicated to computer 320 or otherwise viewed by the recipient. In one example, system 300 replaces all information associated with electronic message 330 that could itself identify the sending user. In one embodiment, a predetermined display name for the sending user that does not provide unique identification of the sending user may be generated and associated with corresponding header information. In another example, system 300 may utilize a display name that includes information that uniquely identifies the sending user (e.g., login name, email address, etc.).

In one example, header information for a particular electronic message, such as header information, may include, but is not limited to, a reply ID, a message ID, a date/time associated with the electronic message (e.g., date/time of creation, date/time of delivery, etc.), a display name representing a sender of the electronic message, and any combinations thereof.

At step 540, an electronic message 330 is associated with a recipient represented by the recipient address. In one example, a location of the recipient is determined. As used herein, a location may include a message mailbox, a message server associated with the recipient, a computer associated with the recipient, an electronic address of the recipient, a display name for the recipient in system 300, or the like. For example, system 300 may identify a user by a variety of identities (e.g., display name, login ID, associated email address, text messaging address, instant messaging address, SMS address, mobile number, BLACKBERRY PIN, or the like) to determine a routing for electronic message 330. As discussed above, if the recipient is not a registered user of system 300, a notification may be sent to a third-party system of the existence of electronic message 330. For example, if the recipient is identified by a third-party email address, a notification may go to the e-mail recipient over the third-party email network. Similarly, if the recipient is identified by a Blackberry PIN, a notification may go to the recipient over the Blackberry network.

At step 545, header information and message content are stored. In one example, header information and message content are stored separately from each other (e.g., in separate files, in separate databases, in separate tables, etc.). A message ID may be used to maintain a correspondence between the separated components of electronic message 330. Storage may occur in a variety of ways including, but not limited to, storage at a location of the recipient and storage at server 310. In one example, the header information and message content of electronic message 330 are stored in a storage medium of server 310 in separate tables.

In another example, each user of system 310 is assigned a storage directory (e.g., on a server, on a user computer such as in a peer-to-peer arrangement, etc.). Upon association of a user with the recipient address, the message content and header information for any electronic messages to that user may be stored in that user's storage directory. The following XML file definition illustrates an example of header information for two electronic messages stored in a user storage directory.

```
<?xml version="1.0" encoding="UTF-8" ?>
<streams>
<streamsummary id="8C515D3B6A3A99C6C1A1F1DE019C7AB0"
    from="user one" datereceived="1143660969"
    replyid="6C04279318E53F61A9D7984ADD4C3E1A" />
<streamsummary id="98F78AD49BFC35B36357850C107460DF"
from="user four
    [mike.smith@onlinemail.com]" datereceived="1143665437"
    replyid="0648B99BE6F9E5AB21F3A163AD242173" />
</streams>
```

The above file definition includes a message ID ("streamsummary id"), a display name ("from"), date received, and reply ID for each message in the recipients storage directory. Note that as an implementation variation, the sending user of the second message has associated therewith a display name, "user four", which includes a reference to an email address, mike.smith@onlinemail.com. This email address may or may not be associated with an actual email account of a third-party system, and may or may not provide actual identifying information related to the sending user. The following message content XML file is stored separately in the storage directory from the above header information.

```
<?xml version="1.0" encoding="UTF-8" ?>
<message id="8C515D3B6A3A99C6C1A1F1DE019C7AB0" "
subject="">
<text>This is my first message to you.</text>
</message>
```

The following second message content XML file is stored separately in the storage directory from the header information.

```
<?xml version="1.0" encoding="UTF-8" ?>
<message id="98F78AD49BFC35B36357850C107460DF" subject="">
<text>This is a reply message to your message from Monday.</text>
</message>
```

Each of the message content XML files includes the corresponding message ID for correlation back to the corresponding header information. Each message content XML file also includes the message content. One skilled in the art would recognize other storage methodologies for separating header information from message content that are consistent with the present disclosure.

Figure 10:
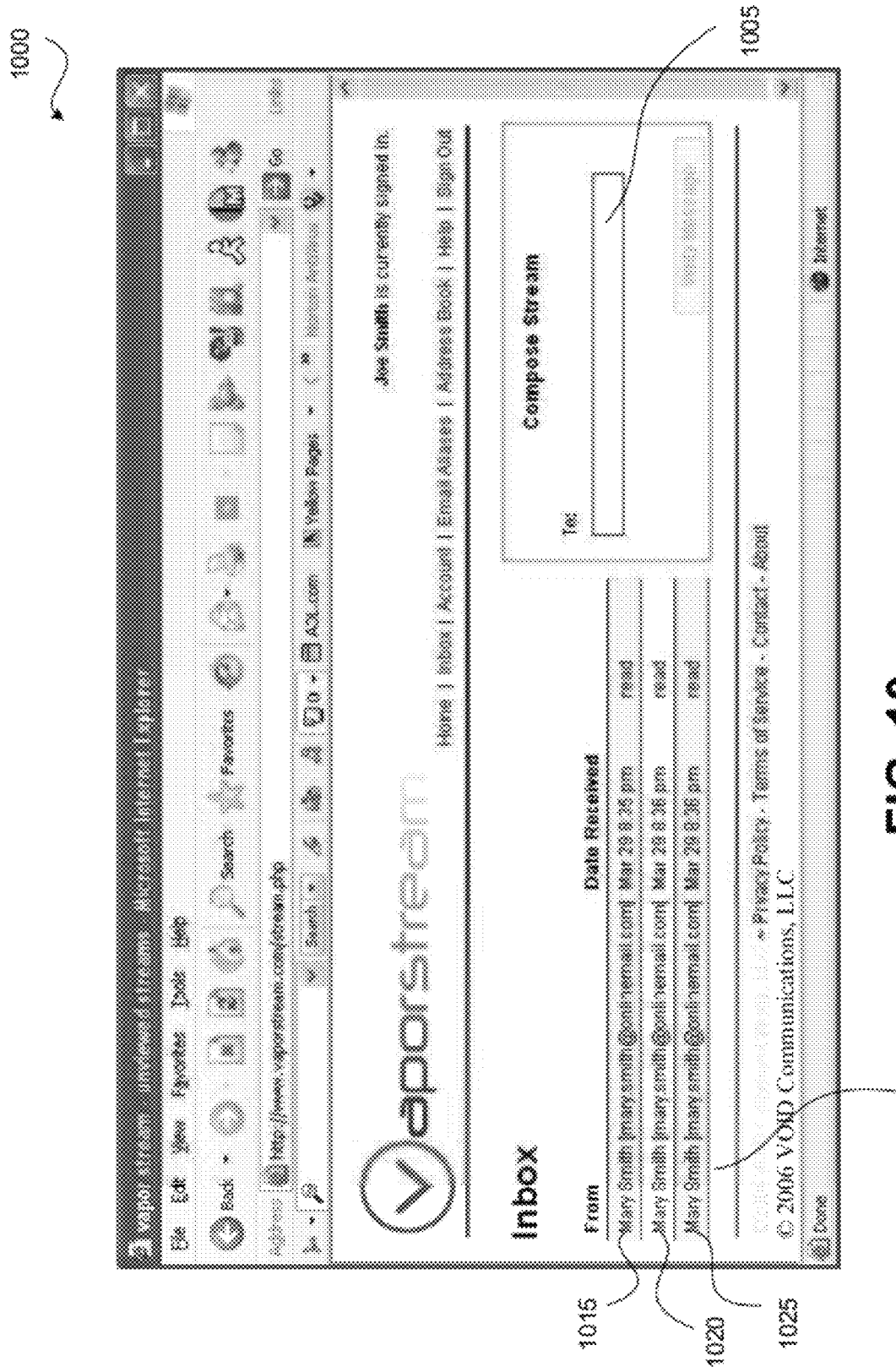
FIG. 10 depicts an exemplary display image including an electronic message listing portion.

Referring again generally to FIG. 5 at step 550 to describe the retrieval of an electronic message by a user, a recipient user logs into system 300 using computer 320. A display image similar to that in FIG. 7 may be utilized as a login display. In one example, upon entry of a valid login ID and password, a communication link between computer 320 and server 310 is established. At step 555 of FIG. 5, a display image having header information is communicated (e.g., from server 310 to computer 320. System 300 provides a display image to computer 320 representing at least some of the header information associated with any electronic messages associated with the recipient user. FIG. 10 illustrates an example display image 1000 including a recipient address input portion 1005 and a message listing portion 1010. Message listing portion 1010 includes a list of header information 1015, 1020, 1025 of three electronic messages. Message listing portion 1010 includes a display name and a date/time received for each of header information 1015, 1020, 1025. Each message container (or header information) 1015, 1020, 1025 may also includes an association to a message ID and an association to a reply ID (although, not displayed in display image 1000). Message content for each electronic message is not displayed via display image 1000.

FIG. 3 illustrates header information and a message content for electronic message 330 being communicated to computer 320. In this example, header information 1015 represents electronic message 330.

In an alternate embodiment, the header information communicated to computer 320 may include a sequence number (ex: 1, 2, 3, etc.) assigned to each electronic message associated with a particular user and/or sent to a particular computer. In such an embodiment, each sequence number may be associated in system 300 with the corresponding message ID. The message ID may be removed from the corresponding header information and/or message content. In this manner, system 300 may avoid sending a message ID to a user computer and instead may send the sequence number, which may be reused when a message is deleted and is, therefore, less traceable from the user computer.

At step 560, a user may select one of the electronic messages indicated by header information 1015, 1020, 1025 (e.g., by selecting a corresponding "read" indicator in message listing 1010). At the time of selection, the message content for each electronic message may not have been communicated to computer 320. In one example, message content may be communicated to computer 320 along with corresponding header information (but, not displayed). In another example, message content may be retained at server 310 until a second request from a user is sent to server 310 to view a message content of a particular electronic message. In such an example, computer 320 requests a message content for a selected electronic message (e.g., electronic message 330 via header information 1015) from server 310. In response to this action, server 310 may associate a message ID from the selected header information and communicate the message content having the corresponding message ID to computer 320. Alternatively, where a sequence number is utilized for each electronic message, server 310 associates the sequence number of the selected electronic message with a corresponding message content and communicates the message content to computer 320.

Figure 11:
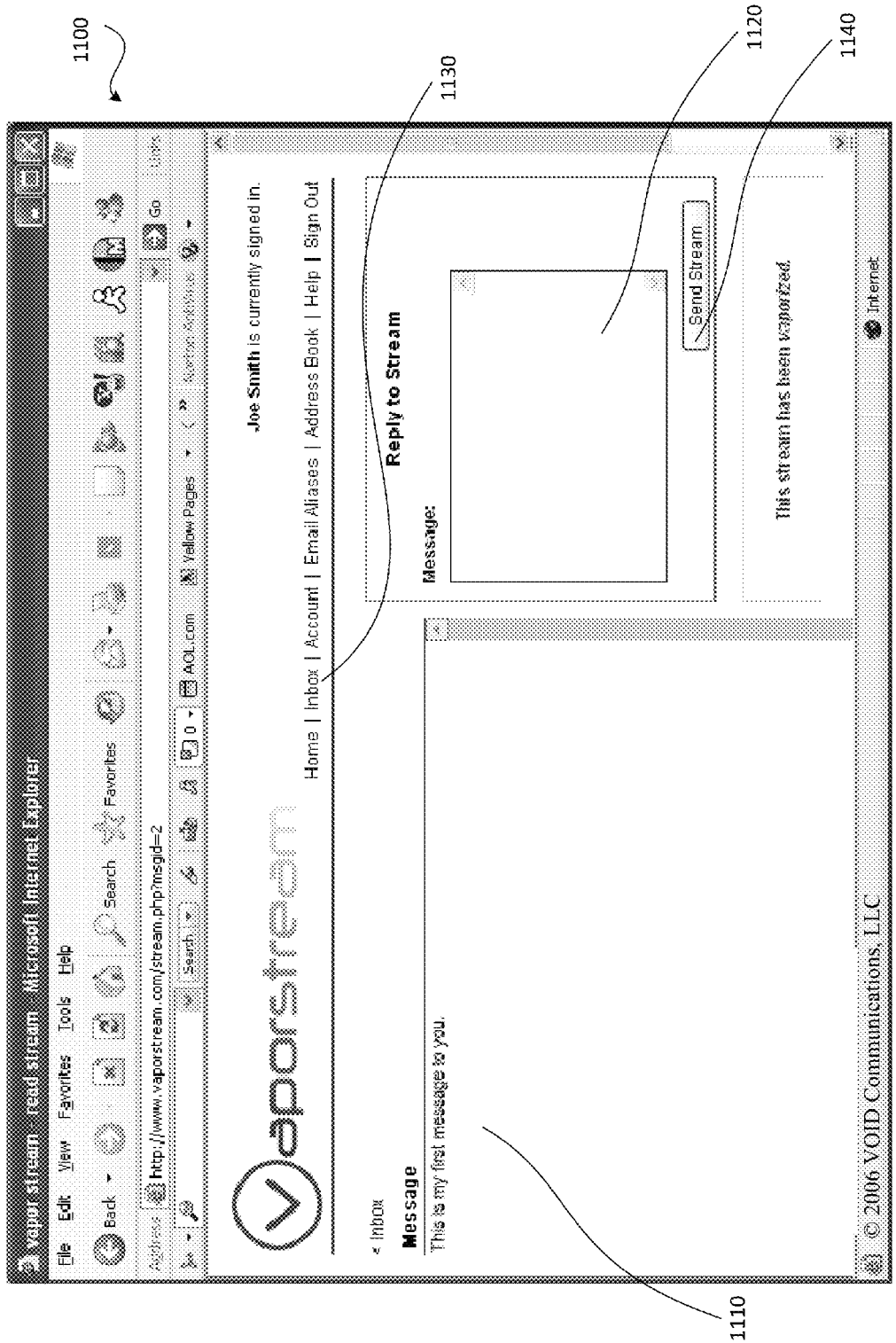
FIG. 11 depicts an exemplary display image including a reply message input portion.

At step 565, a display image including the message content, but none of the header information, is provided at computer 320. FIG. 11 illustrates one example display image 1100 presenting message content, independent of header information, for electronic message 330 upon the selection of header information 1015 in display image 1000 of FIG. 10. Display image 1100 includes a message content portion 1110 including the message content of electronic message 330. Display image 1100 also includes a reply message input portion 1120.

In one alternate embodiment, display image 1100 may employ FLASH technology to display the message content. For example, display image 1100 may require the user to "park" the on-screen cursor in an area in display image 1100 to see the message content, which may be displayed as a Flash movie. Should the cursor be moved, the displayed message content will be hidden from view on the screen to allow the user to quickly prevent the message content from being seen by onlookers. Also, this technology may also be utilized to prevent the message content from being printed using the web browser or application print because the message content will be hidden as soon as the user moves the mouse in attempt to print. In another example, the use of Cascading Style Sheets (CSS) may allow the portion of the display image including the message content to be not shown or hidden during printing.

Referring to FIG. 5, at step 570, the electronic message, such as electronic message 330, is automatically permanently deleted from server 310 at a predetermined time at step 565. In one example, header information is deleted from server 310 upon its communication to computer 320, and then the corresponding message content is deleted from server 310 upon its communication to computer 320. In such an example, once message list 1010 is displayed to a user, the user must view the message content during that session. To achieve the ability to view one message content and return to message list 1010, the header information for non-viewed electronic messages may be retained in memory at computer 320. In another example, header information is retained at server 310 until the corresponding message content is viewed, at which point both the header information and the message content is deleted from server 310. A reply ID for a particular electronic message may be retained in memory of server 310 (e.g., in response to a request for viewing a message content, server 310 may associate a current session ID with the reply ID) until the display image that displays the corresponding message content is closed by the user. This will allow a user to utilize reply message portion 1120 of display image 1100 to reply to the current message content without having to have a unique address for the original sender associated with the message content on computer 320. FIG. 3 illustrates a server-based system. Deletion from an alternate system, such as a peer-to-peer system, may include deletion of an electronic message from storage at a user computer.

As discussed above, other examples of deletion times for deletion from a system, such as system 300, include, but are not limited to, automatic deletion of header information and corresponding message content immediately after the message content is displayed, automatic deletion of header information upon display of a corresponding message content, automatic deletion of message content upon a display of the message content being closed, automatic deletion of header information and/or message content (whether or not they have been viewed) after a predetermined time (e.g., twenty-four hours after being received), automatic deletion of header information and/or message content a predetermined time (e.g., twenty-four hours) after first being displayed, and any combinations thereof. In one example, system 300 is configured to require a given deletion scheme (e.g., automatic permanent deletion of an electronic message upon displaying the electronic message and/or one or more of its components) regardless of a desire of a sending and/or recipient user.

One example of a deletion algorithm appropriate for deletion of electronic messages from system 300 include, but is not limited to, US Department of Defense (DoD) clearing and sanitizing standard DoD 5220.22-M. In an alternative embodiment, server computer 310 may delete an electronic message, such as electronic message 330 and the corresponding reply ID from its own memory if the recipient fails to retrieve the electronic message within a predetermined amount of time.

Figure 12:
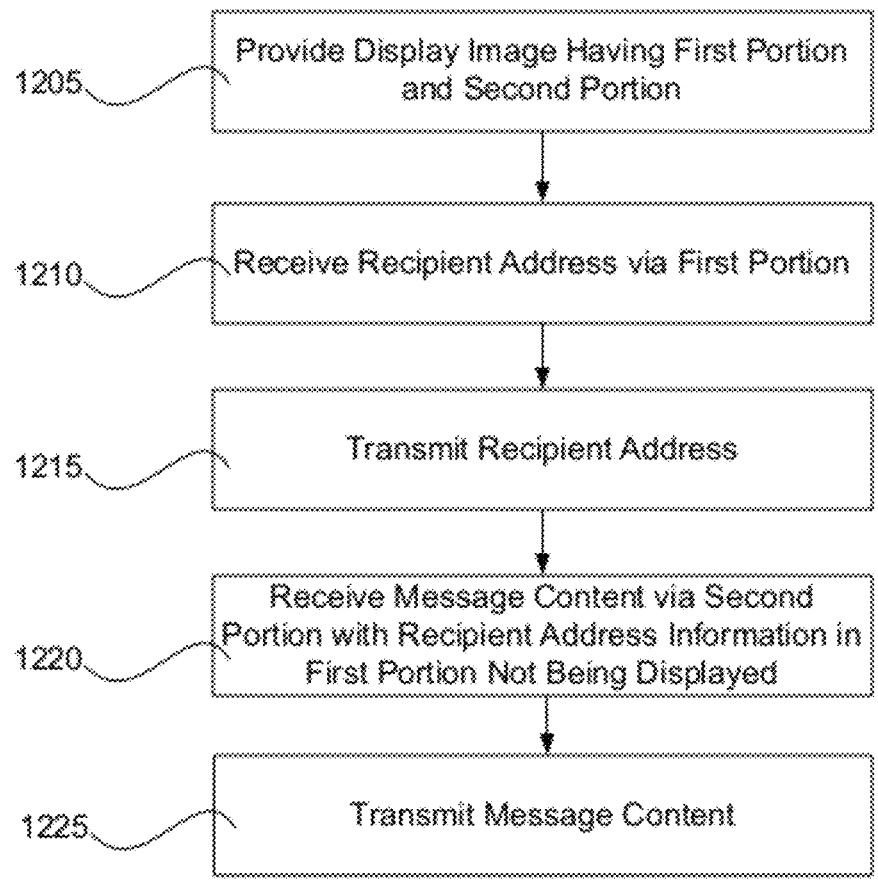
FIG. 12 illustrates an exemplary one exemplary implementation of a single display image screen method with separation of header and content information on entry by a sending user of a computer.

In one example, after viewing the message content, the user may select a link 1130 on display image 1100 to return to the message listing (e.g., message listing 1010 of FIG. 10), or otherwise close the display image (step 575 of FIG. 5). In another example, after viewing the message content, the user may choose to respond to electronic message (step 580 of FIG. 5), as will be described in further detail hereinafter. If the user fails to respond to the message content within a predetermined amount of time (e.g., 1 hour) an associated reply ID may be deleted from server 310. If the user chooses to return to the listing of messages, the message content may be automatically deleted from the recipient's computer 320 after viewing (step 585 of FIG. 5). For example, the message content will exist only in RAM, and possibly in virtual memory established in the disk drive, in computer 320 from the time the user views the message content until the loading of the next screen into computer 320, after which the message is effectively deleted. Furthermore, in one example, the listing of messages (e.g., message listing 1010 of FIG. 10), will no longer include the header information for a particular electronic message (e.g., header information 1015 of electronic message 330) that has been deleted from server 310, and the session ID will no longer include reference to the reply ID. In other words, the user will not be able to view that message again or reply to the message once it has been deleted. For example, FIG. 12 illustrates message list 1010 after electronic message 330 has been deleted from server 310 and computer 320.

In an alternative embodiment, electronic messages may be sent, stored, and/or retrieved using encryption technology. Various encryption technologies are known to those skilled in the art. For example, a combination of public and private encryption keys may be utilized by users and the system to further ensure security and reduce traceability of electronic messages until deletion.

Figure 6:
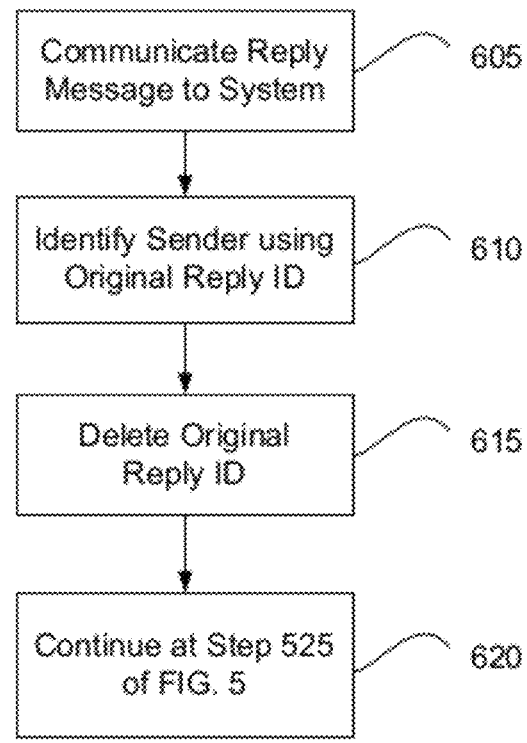
FIG. 6 illustrates another example of a flow chart depicting another exemplary method according to the present disclosure.

Referring to FIGS. 3 and 6, operation of system 310 in optionally sending a reply message 340 from user computer 320 to user computer 315 can be described. As shown for example in FIG. 11, the recipient user of the original electronic message (e.g., electronic message 330) may choose to reply to the message utilizing reply message input portion 1120. Reply message input portion 1120 allows a user to input a message content for a reply message. In this example, there is no need to input a recipient address as an original reply ID may be utilized by system 300 in determining the routing of the reply electronic message. After the user completes reply message input portion 1120, he or she may select the "send stream" button 1140. In response, computer 320 communicates the reply message content to server computer 310 (step 605 of FIG. 6). After the reply message content is communicated, computer 320 retains no trace of the message's existence. For example, the message will exist only in RAM, and possibly in virtual memory established in the disk drive, in computer 320 from the time the user types the message until the loading of the next screen into computer 320, after which the message is effectively deleted. In an alternative embodiment, a display-based keyboard, as discussed above, may be utilized as part of display image 1100 for inputting reply message content.

In one example, upon receipt of the reply message content, server 310 determines the reply ID for the original message (e.g., from the current session ID), and uses the reply ID to associate the electronic message with the user that sent the original message 330 (step 610 of FIG. 6). This may be accomplished in a variety of ways including, but not limited to, a lookup table, a database, or the like, which provides a correlation between the reply ID and the sender of the initial message. At step 615, system 300 then deletes the initial reply ID (e.g., the reply ID for message 330) from server 310's memory. In an alternate embodiment, the identity of the sender of an original electronic message may be determined from another identifier associated with the electronic message (e.g., display name, login ID, associated email address, text messaging address, instant messaging address, SMS address, mobile number, BLACKBERRY PIN, or the like).

Next at step 620, the server 310 may generate another reply ID and associate the reply ID with reply message 340 in a similar fashion as discussed above for electronic message 330. Server 310 may also generate another message ID, which establishes a correlation between the message content of reply message 340 and header information for reply message 340. Header information and message content for reply message 340 are handled and stored similarly as described above with respect to electronic message 330. Reply message 340 may be viewed by its recipient in the same manner as original electronic message 330 was viewed.

Advantageously, the system 300 allows the users of the computers 315 and 320 to have a private conversation over network 325. After messages, such as electronic message 330 and reply message 340, are communicated the sender leaves no proof of the message on his or her computer. In one example, after the recipient views the message (or at another predetermined time), the message no longer exists on system 300, thus ensuring that the message cannot be forensically recreated and ensuring that there is no record of the message remaining on system 300. In another example, no copies of an electronic message are ever delivered to a user computer. In such an example, only non-caching display images of header information and message content are displayed separately. The header information and message content may be immediately, automatically, and permanently deleted from the system upon display. Once each display image is closed, the information is gone forever. Thus, in this example, there is never a copy on the user computer to be archived, forwarded, copied, pasted, etc. In another aspect, separate display of header information and message content prevents a single screen capture at a user computer from creating a complete record of the electronic message. In yet another aspect, a system and method according to the present disclosure may provide an end-to-end recordless electronic messaging system that upon the deletion of the electronic message leaves no trace of the message content, header information, or the fact that it was created, existed, delivered, viewed, etc.

FIG. 4 is a schematic diagram depicting a system 400 having an alternative network topology. The embodiment of FIG. 4 is substantially similar to that of FIG. 3, except that system 400 of FIG. 4 employs two message servers 405 and 410 operably coupled to user computers 415 and 420 by one or more networks 425. In the embodiment of FIG. 4, the two message servers 415 and 420 together perform the tasks previously described for the single message server 310 of FIG. 3. For example, in the method for sending the initial message 330, message server 405 may perform steps 505 to 535 and a portion of step 540 of FIG. 5, while message server 410 acts as the "recipient location" and performs a portion of step 540 and steps 545 to 585 of FIG. 5. It will be appreciated that both servers 405 and 410 may keep track of the reply ID and both servers 405 and 410 delete the message after it has been passed along. This arrangement is particularly useful where message servers 405 and 410 are each associated with a different enterprise, business organization, LAN, or the like.

As discussed above, separation of entry of header information from message content may occur via the use of a single display image screen in which the header information (such as the recipient address) and the message content are not displayed on the single display image screen at the same time. Such a single display image screen may be utilized in an electronic messaging system, such as the electronic messaging system discussed above with respect to FIG. 1. Such a single display image screen may include a portion for entering a recipient address (and, optionally, additional header information, such as a message subject line) and a portion for entering a message content. A display image screen having each of these two portions includes the two portions being visible to a user at the same time on the computer, but only allowing data that has been entered in (or is included in) either the recipient address entry portion or the message content entry portion to be visibly displayed at a time. Exemplary ways to prevent a recipient address entry portion of a message content entry portion from being displayed at the same time are discussed further below with respect to the examples of FIGS. 12 to 14. Other aspects of such a display image screen that displays an entry portion for a recipient address and an entry portion for a message content can be configured in a variety of ways. For example, the single display image may appear on a display screen of the computer with the recipient address entry portion in one "window" and the message content entry portion in another "window," both windows visible to the user at the same time. Additionally, it is contemplated that either or both of the recipient address portion and the message content portion may include two or more data entry sections (e.g., for entering multiple recipient addresses, for entering carbon copy addresses, for entering other header information, for entering an message content attachment, etc.). A display image may also include one or more user controls for actuating one or more functionalities of the display image. Example functionalities include, but are not limited to, indicating that the entry of a recipient address is complete, indicating that the entry of a message content is complete, toggling between entry of a recipient address and a message content, indicating that the electronic message is ready for transmission from the computer, and any combinations thereof. One example of a display image screen is discussed further below with respect to FIGS. 15 to 17.

FIG. 12 illustrates one exemplary implementation of a single display image screen method with separation of header and content information on entry by a sending user of a computer. At step 1205, a display image screen is provided that includes a portion for entering a recipient address for an electronic message and a portion for entering a message content. Exemplary recipient addresses and message content are discussed above (e.g., with respect to FIG. 1). At step 1210, a recipient address is received from a user of the computer via the portion of the display image screen for entering a recipient address. At step 1215, the recipient address is transmitted from the computer. At step 1220, a message content is received from a user of the computer via the portion of the display image screen for entering a message content.

The display image screen and the two portions are configured so that the data representing the recipient address and the data representing the message content are not visibly displayed at the same time. Example ways to make data not visibly displayed on a display image screen include, but are not limited to, blurring the data, covering the data (e.g., with a graphical element), darkening the display of the display portion containing the data, removing the data from the display (e.g., while leaving the display image of the portion of the display on the screen), and any combinations thereof.

The timing of making the data of one portion of a display image screen not visibly displayed while data in another portion of the display image screen is visibly displayed can occur in a variety of ways. Example timings include, but are not limited to, making data of one portion not visibly displayed upon actuation of an interface control by a user (e.g., actuation of a control indicating that the entry of a recipient address is complete, indicating that the entry of a message content is complete, toggling between entry of a recipient address and a message content entry, indicating that the electronic message is ready for transmission from the computer, etc.), making data of one portion not visibly displayed upon commencing entry of data in the other portion, making data of one portion not visibly displayed upon the user stopping data entry in that portion for an amount of time (e.g., a predetermined and configured amount of time), and any combinations thereof.

In another exemplary aspect of separating the display of a recipient address from a message content on a single display image, a user can be restricted from entering data into one portion of the display image based on a variety of factors. Example factors for use in restricting entry of data into a portion (e.g., a recipient address entry portion, a message content entry portion) include, but are not limited to, restricting data entry into one portion of the display image until data is no longer visible to the user in the another portion of the display image (e.g., restricting entry of message content in the message content entry portion until the recipient address information is no longer visible in the recipient address entry portion), restricting data entry into one portion of the display image until data entered into another portion of the display image has been transmitted from the computer (e.g., restricting entry of data in a message content entry portion until a recipient address has been transmitted from the computer), and any combinations thereof. Example ways to restrict entry into a portion of a display image include, but are not limited to, blurring the entry portion (e.g., such that any information typed in the portion is not visible), covering the entry portion (e.g., with a graphical element), darkening the display of the display portion, disabling any data entry in the portion (e.g., not allowing keyboard text entry, not allowing pointing device to click into entry portion), removing the data from the display (e.g., while leaving the display image of the portion of the display on the screen), and any combinations thereof.

At step 1225, the message content is transmitted from the computer. In the example shown in FIG. 12, the recipient address is transmitted prior to receiving the message content from the user and the message content is transmitted thereafter. It is contemplated that other variations are possible for when to transmit a recipient address (and possibly other header information) and a message content. Several variants of separate transmission of header information and message content from a sending user computer are discussed further above. In another example, a recipient address and a message content are kept at the sending user computer until the entire message is completed (e.g., as indicated by actuation of a user interface control by the sending user). In yet another example, a recipient address is transmitted from a user computer upon actuation by a user of an interface control and the message content is transmitted from a user computer upon actuation by a user of an interface control. In still another example, a recipient address is transmitted at a time after the sending user switches to data entry of the message content (e.g., at about the same time as the switch to the message content entry portion and the hiding/obscuring/etc. of the recipient data in the recipient address entry portion). In one such example, the recipient address data may also be retained at the sending computer (e.g., in a RAM memory) until a later time (e.g., at an actuation of a user control indicating a desire to no longer retain the information) prior to the complete transmission of the electronic message from the sending computer (e.g., not leaving a trace of the recipient address or the message content on the sending computer, such as is discussed above). In an example where the recipient address data is retained at the sending computer beyond the first switch to data entry in a message content entry portion, a user may utilize the information for a variety of purposes. Examples of such purposes include, but are not limited to, allowing for toggling back to the recipient address entry portion for viewing the recipient address, allowing for toggling back to the recipient address entry portion for updating the recipient address (e.g., adding, deleting, changing a recipient), and any combinations thereof. In an example where an update is made to a recipient address data in a recipient address entry portion of a display image, the updated recipient address data may be transmitted from the computer at any of a variety of times prior to completion of transmission of the electronic message (e.g., at time of updating, at time of actuation of a user interface control indicating the completion of entry of the recipient address, at time of actuation of a user interface control indicating the completion of the electronic message, etc.).

Figure 13:
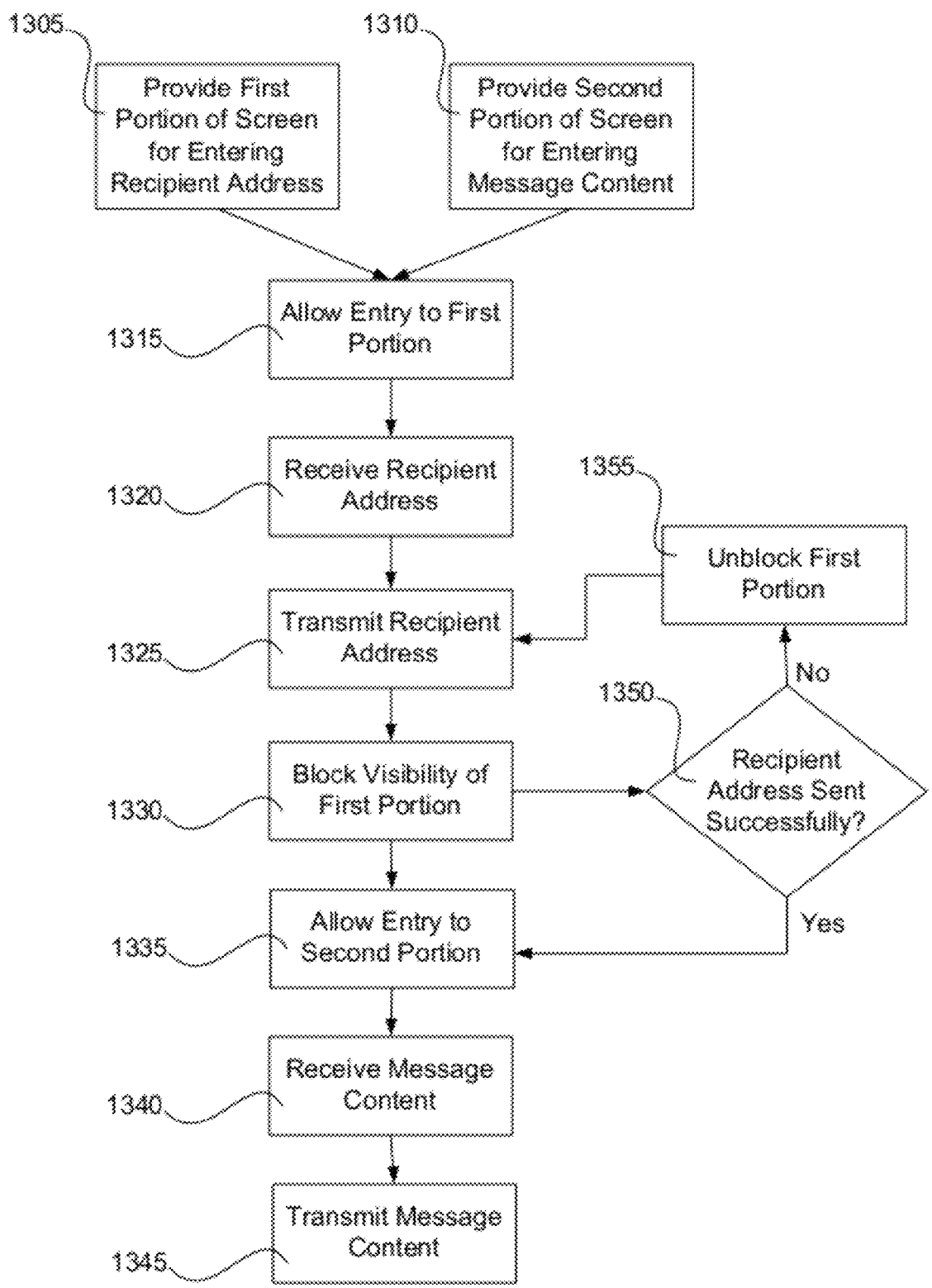
FIG. 13 depicts another exemplary implementation of a single display image screen method with separation of header and content information on entry by a sending user of a computer.

FIG. 13 illustrates another exemplary implementation of a single display image screen method with separation of header and content information on entry by a sending user of a computer. Aspects of this exemplary implementation are similar to those discussed above (e.g., with respect to the implementation of FIG. 12) except as indicated. At step 1305, a first portion of a display image screen is provided for entering a recipient address. At step 1310, a second portion of the display image screen is provided for entering a message content. At step 1315, data entry (e.g., of one or more recipient addresses) is allowed in the first portion, while not allowing data entry in the second portion. At step 1320, a recipient address is received via the first portion. At step 1325, the recipient address is transmitted from the computer. At step 1330, the recipient address information in the first portion is made to be not visible to the user (e.g., by blocking its visibility, etc.). At step 1335, data entry is allowed in the second portion. At step 1340, a message content is received via the second portion. At step 1345, the message content is transmitted from the computer. Optionally, at step 1350 a check is made to determine if the recipient address was sent successfully from the computer. Examples of an unsuccessful attempt include, but are not limited to, a failure of communications hardware (e.g., network failure), a decision by the user to update the recipient address (e.g., as discussed above), and any combinations thereof. If at step 1350 a successful send is determined, the process moves to step 1335. If at step 1350 an unsuccessful send is determined, the process moves to step 1325. In an alternative example (e.g., where the sending user wishes to update the recipient address), step 1350 may proceed to step 1315 to allow entry in the first portion (e.g., while blocking entry to the second portion and blocking visibility of any data in the second portion).

Figure 14:
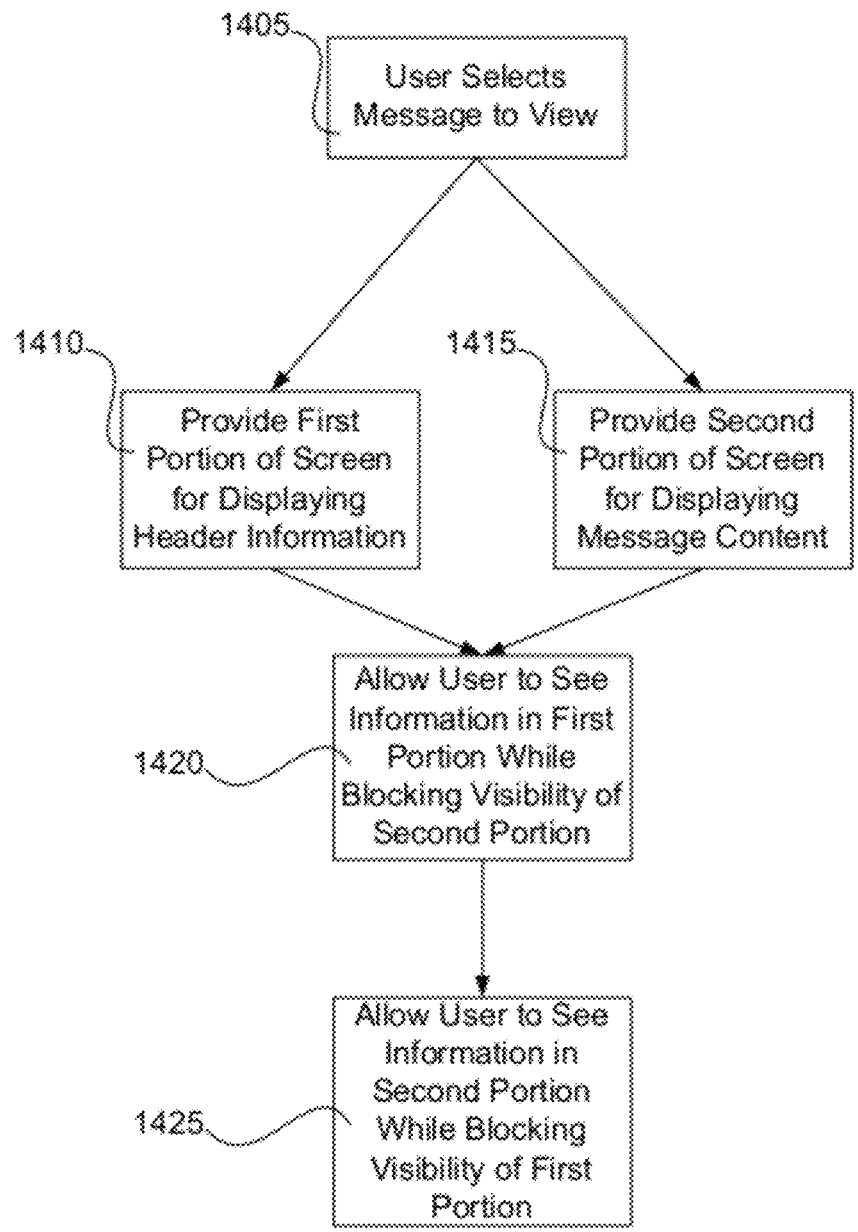
FIG. 14 depicts an exemplary implementation of a single display image screen method utilized at a recipient end of a messaging system.

FIG. 14 illustrates an exemplary implementation of a single display image screen method utilized at a recipient end of a messaging system (e.g., the messaging system discussed above with respect to FIG. 1). Those relevant aspects of the single display image at the sending side as discussed above apply to the recipient side, except where indicated otherwise. At step 1405, a user selects a message to view (e.g., from a message list showing header information, such as that shown in FIG. 10). At step 1410, a first portion of a display image screen is provided that is configured to display header information (e.g., a recipient address, a sender address, a subject, a time/date of message, etc.). At step 1415, a second portion of a display image screen is provided that is configured to display message content. At step 1420, a user is allowed to see information in the first portion while visibility of information in the second portion is blocked (e.g., in a similar way as that discussed above with respect to the method of FIG. 12). At step 1425, a user is allowed to see information in the second portion while visibility of information in the first portion is blocked. It is contemplated that a recipient user may toggle between visibility of portions as discussed above with respect to the sending side display image.

Figure 15:
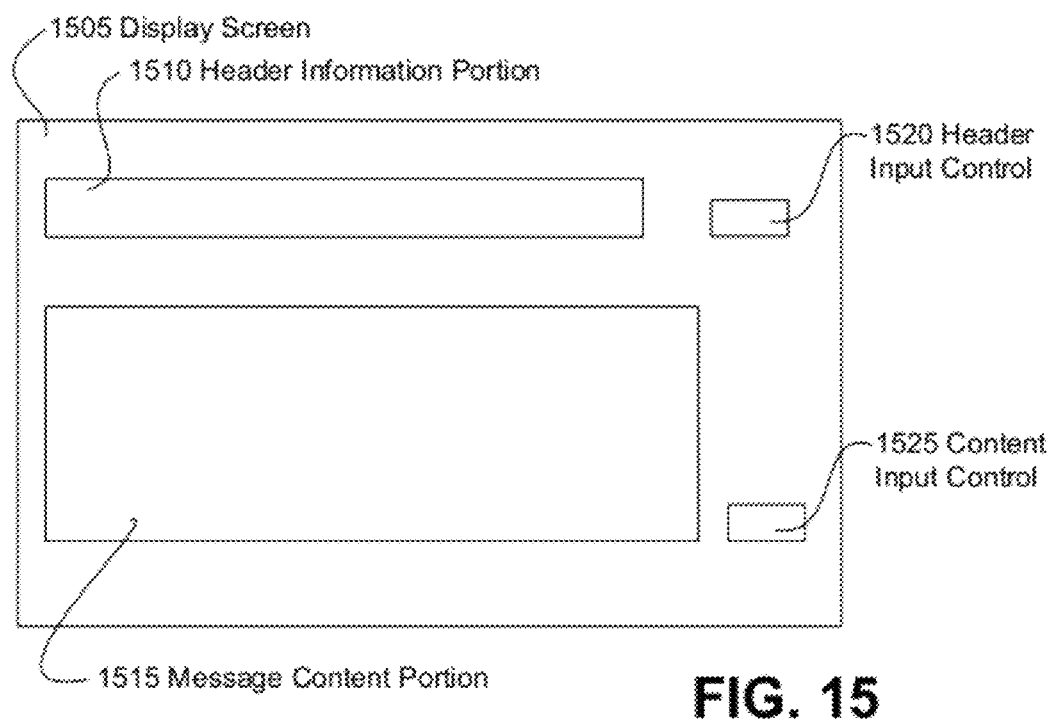
FIG. 15 depicts an example implementation of a display image screen having a first portion for entry of a recipient address (and/or other header information) and a second portion for entry of a message content.

FIG. 15 illustrates an example of a display image screen 1505 having a first portion 1510 for entry of a recipient address (and/or other header information) and a second portion 1515 for entry of a message content. As discussed above, it is contemplated that each of portions 1510 and 1515 may include multiple data entry sections (e.g., appearing as separate portions of display image screen 1505). Display image 1505 includes a header input user interface control 1520. Control 1520 may be utilized by a user to actuate the control (e.g., to indicate that the user is done entering into portion 1510). In one example, upon actuation of control 1520, entry of data into portion 1515 may be allowed while removing visibility of data in portion 1510. Example user interface controls include, but are not limited to, a button, a textual element, a graphical element, a hyperlink, and any combinations thereof. Example ways to actuate a user interface control include, but are not limited to, actuating the control using a computer keyboard, actuating a control using a touchscreen display, actuating a control using a computer pointing device, speaking into a voice recognition device of the computer, and any combinations thereof. Display image 1505 also includes a message content input user interface control 1525. In one example, upon actuation of control 1525, entry of data into portion 1510 may be allowed while removing visibility of data in portion 1515 (e.g., allowing toggling between data entry in portions 1510 and 1515. In another example, upon actuation of control 1525, electronic message entry may be completed (e.g., causing the message content and/or header information to be transmitted from the computer). Display image 1505 may include other user interface controls to effectuate functionality as discussed above with respect to FIGS. 12 to 14. Transmission of message content and header information is discussed above with respect to FIGS. 12 to 14. Other operational aspects of the methods of FIGS. 12 to 14 may also be implemented using a display image screen, such as screen 1505.

Figure 16:
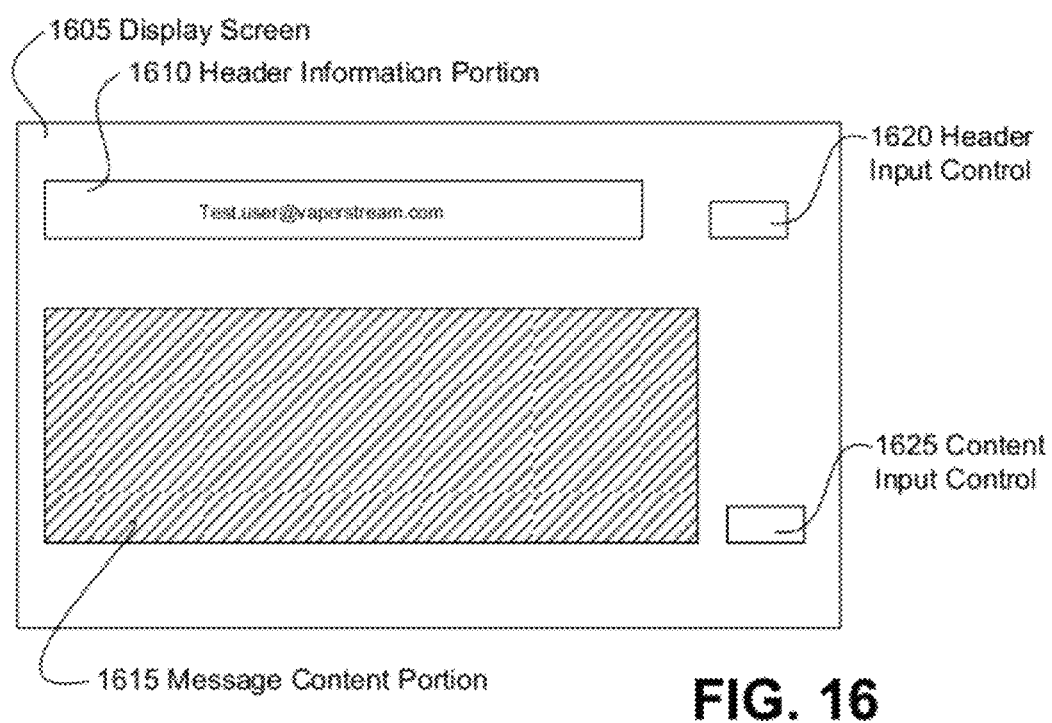
FIG. 16 depicts another example implementation of a display image screen having a first portion for entry of a recipient address (and/or other header information) and a second portion for entry of a message content.

FIG. 16 illustrates another implementation of a display image screen 1605 in which data representing a recipient address has been entered into a header information entry portion 1610. Operation of display image screen 1605 is similar to that of display image screen 1505, except as indicated. A message content entry portion 1615 of display image 1605 has been blocked such that data entry into portion 1615 is blocked and visibility of any data in portion 1615 is blocked while the data in portion 1610 is still available to the user. Display image 1605 includes a header input user interface control 1620 and a message content input user interface control 1625. Example uses of controls 1620 and 1625 include, but are not limited to, indicating that the entry of a recipient address in portion 1610 is complete, indicating that the entry of a message content in portion 1615 is complete, toggling between entry/viewing of a recipient address in portion 1610 and a message content in portion 1615, indicating that the electronic message is ready for transmission from the computer, and any combinations thereof.

Figure 17:
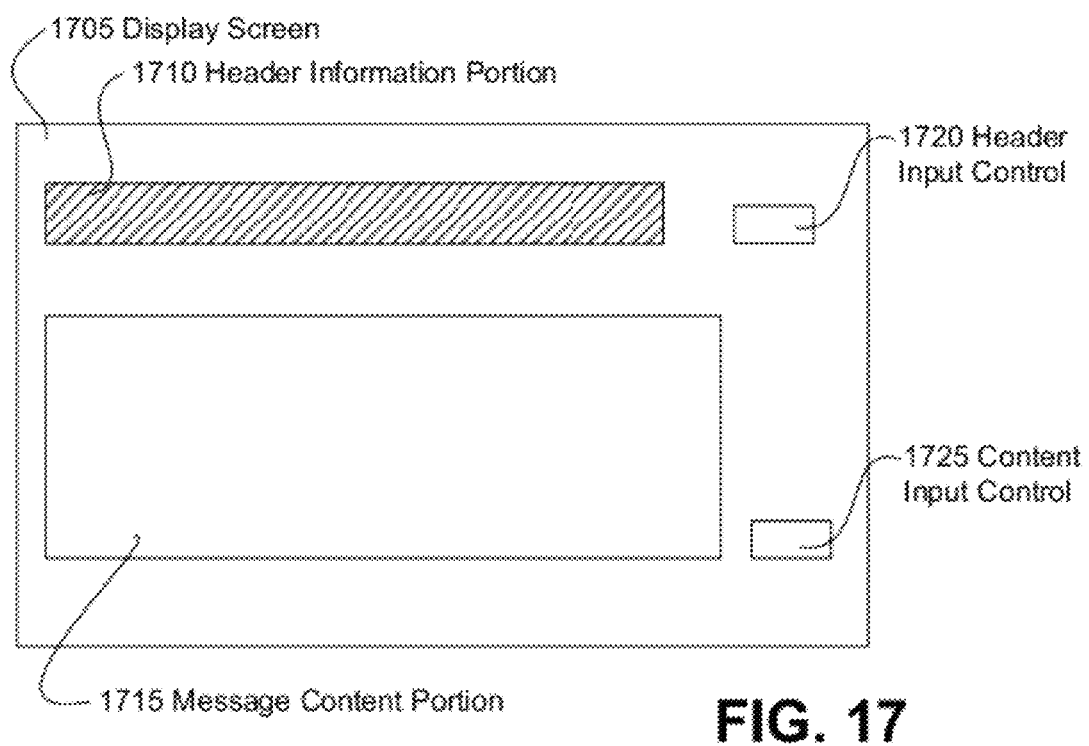
FIG. 17 depicts yet another example implementation of a display image screen having a first portion for entry of a recipient address (and/or other header information) and a second portion for entry of a message content.

FIG. 17 illustrates an example of a display image screen 1705 that is similar to display image screen 1605. Display image 1705 includes a header information entry portion 1710 that is blocked for visibility and user data entry (i.e., via dark shading of portion 1710), a message content entry portion 1715 that is ready for data entry, a header input user interface control 1720, and a message content user input interface control 1725.

It is to be noted that the above described aspects and embodiments may be conveniently implemented using a computer programmed according to the teachings of the present specification, as will be apparent to those skilled in the computer art. Appropriate software coding can readily be prepared by skilled programmers based on the teachings of the present disclosure, as will be apparent to those skilled in the software art.

Such software can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions. The term "computer readable medium" as used herein refers to a hardware medium and does not include a signal.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A computer-implemented method of reducing traceability of an electronic message having header information and a message content, the method comprising:
providing at a first computer a first display image screen having a first portion for entering an address of a recipient of an electronic message and a second portion for entering a message content;
receiving at the first computer an input of a recipient address via the first portion;
transmitting the recipient address from the first computer;
receiving at the first computer the message content via the second portion, wherein the recipient address and the message content are not displayed on the first display image screen at the same time; and
transmitting the message content from the first computer to a server computer, wherein the message content is transmitted from the first computer separately from the recipient address, the recipient address and the message content each including an association prior to being transmitted from the first computer to allow the message content and the recipient address to be related to each other at a later time by the server computer.

2. A method according to claim 1, wherein the second portion restricts a user of the first display image screen from entering any information until after the recipient address is no longer visible in the first portion.

3. A method according to claim 1, wherein the second portion restricts a user of the first display image screen from entering any information until the recipient address is transmitted from the first computer.

4. A method according to claim 1, wherein the second portion restricts a user of the first display image screen from entering information into the second portion by a restriction selected from the group consisting of blurring the display of the second portion, darkening the display of the second portion, hiding any information in the second portion from display, disabling entry into the second portion, and any combinations thereof.

5. A method according to claim 1, wherein information previously input into the first portion is not visible after the recipient address is transmitted from the first computer.

6. A method according to claim 1, further comprising actuating a control on the first display image after inputting the recipient address to initiate said transmitting the recipient address from the first computer.

7. A method according to claim 1, further comprising actuating a control on the first display image after inputting the recipient address to initiate the recipient address no longer being visible to a user of the first display image screen.

8. A method according to claim 7, wherein the control includes a control selected from the group consisting of a button, a graphical element, a hyperlink, and any combinations thereof.

9. A method according to claim 1, further comprising actuating a control on the first display image screen after said receiving the message content.

10. A method according to claim 9, wherein said actuating a control initiates a process of making the message content no longer visible on the first display image screen.

11. A method according to claim 9, wherein said actuating a control initiates said transmitting the message content.

12. A method according to claim 1, further comprising providing at a second computer a second display image screen having a third portion for displaying at least a portion of a header information of the electronic message and a fourth portion for displaying at least a portion of the message content, wherein the second display image screen restricts display such that the at least a portion of the header information and the at least a portion of the message content are not displayed on the second display image screen at the same time.

13. A method according to claim 12, further comprising displaying the at least a portion of the header information via the third portion while not displaying the at least a portion of the message content.

14. A method according to claim 13, wherein the at least a portion of the message content is not displayed on the second display image screen until after the at least a portion of the header information is no longer visible on the second display image screen.

15. A method according to claim 14, further comprising actuating a control on the second display image screen after the at least a portion of the header information is displayed via the third portion.

16. A method according to claim 1, wherein the method is performed so that following said transmitting of the message content and said transmitting of the recipient address, no indication of the electronic message is left on the first computer.

17. A computer readable hardware storage medium containing computer executable instructions implementing a method of reducing traceability of an electronic message, the instructions comprising:
   a set of instructions for providing at a first computer a first display image screen having a first portion for entering an address of a recipient of an electronic message and a second portion for entering a message content;
   a set of instructions for receiving at the first computer an input of a recipient address via the first portion;
   a set of instructions for transmitting the recipient address from the first computer;
   a set of instructions for receiving at the first computer the message content via the second portion, wherein the recipient address and the message content are not displayed on the first display screen at the same time; and
   a set of instructions for transmitting the message content from the first computer to a server computer, wherein the message content is transmitted from the first computer separately from the recipient address, the recipient address and the message content each including an association prior to being transmitted from the first computer to allow the message content and the recipient address to be related to each other at a later time by the server computer.

18. A computer readable hardware storage medium according to claim 17, further comprising a set of instructions for allowing the second portion to restrict a user of the first display image screen from entering any information until after the recipient address is no longer visible in the first portion.

19. A computer readable hardware storage medium according to claim 17, further comprising a set of instructions for allowing the second portion to restrict a user of the first display image screen from entering any information until the recipient address is transmitted from the first computer.

20. A computer readable hardware storage medium according to claim 17, further comprising a set of instructions for allowing the second portion to restrict a user of the first display image screen from entering information into the second portion by a restriction selected from the group consisting of blurring the display of the second portion, darkening the display of the second portion, hiding any information in the second portion from display, disabling entry into the second portion, and any combinations thereof.

21. A computer readable hardware storage medium according to claim 17, wherein information previously input into the first portion is not visible after the recipient address is transmitted from the first computer.

22. A computer readable hardware storage medium according to claim 17, further comprising a set of instructions for allowing the actuating of a control on the first display image after inputting the recipient address to initiate said transmitting the recipient address from the first computer.

23. A computer readable hardware storage medium according to claim 17, further comprising a set of instructions for allowing the actuating of a control on the first display image after inputting the recipient address to initiate the recipient address no longer being visible to a user of the first display image screen.

24. A computer readable hardware storage medium according to claim 17, further comprising a set of instructions for allowing the actuating of a control on the first display image screen after said receiving the message content.

25. A computer readable hardware storage medium according to claim 24, wherein said set of instructions for allowing the actuating of a control further comprises a set of instructions for initiating a process of making the message content no longer visible on the first display image screen.

26. A computer readable hardware storage medium according to claim 24, wherein said set of instructions for allowing the actuating of a control further comprises a set of instructions for initiating said transmitting the message content.

27. A computer readable hardware storage medium according to claim 17, further comprising a set of instructions for providing at a second computer a second display image screen having a third portion for displaying at least a portion of a header information of the electronic message and a fourth portion for displaying at least a portion of the message content, wherein the second display image screen restricts display such that the at least a portion of the header information and the at least a portion of the message content are not displayed on the second display image screen at the same time.

28. A computer readable hardware storage medium according to claim 27, further comprising a set of instructions for displaying the at least a portion of the header information via the third portion while not displaying the at least a portion of the message content.

29. A computer readable hardware storage medium according to claim 28, wherein the at least a portion of the message content is not displayed on the second display image screen until after the at least a portion of the header information is no longer visible on the second display image screen.

30. A computer readable hardware storage medium according to claim 29, further comprising a set of instructions for actuating a control on the second display image screen after the at least a portion of the header information is displayed via the third portion.

31. A system for reducing traceability of an electronic message, the system comprising:
- a means for providing at a first computer a first display image screen having a first portion for entering an address of a recipient of an electronic message and a second portion for entering a message content;
- a means for receiving at the first computer an input of a recipient address via the first portion;
- a means for transmitting the recipient address from the first computer;
- a means for receiving at the first computer the message content via the second portion, wherein the recipient address and the message content are not displayed on the first display screen at the same time; and
- a means for transmitting the message content from the first computer to a server computer, wherein the message content is transmitted from the first computer separately from the recipient address, the recipient address and the message content each including an association prior to being transmitted from the first computer to allow the message content and the recipient address to be related to each other at a later time by the server computer.

* * * * *